US012067855B2

(12) United States Patent
Abueshsheikh et al.

(10) Patent No.: US 12,067,855 B2
(45) Date of Patent: Aug. 20, 2024

(54) DOOR LOCK WITH MAGNETOMETERS

(71) Applicant: ASSA ABLOY Residential Group, Inc., New Haven, CT (US)

(72) Inventors: Rami Abueshsheikh, Berkeley, CA (US); Shannon Petty, San Francisco, CA (US); Aaron Treger, Pinole, CA (US)

(73) Assignee: ASSA ABLOY Residential Group, Inc., New Haven, CT (US)

( * ) Notice: Subject to any disclaimer, the term of this patent is extended or adjusted under 35 U.S.C. 154(b) by 0 days.

(21) Appl. No.: 17/475,108

(22) Filed: Sep. 14, 2021

(65) Prior Publication Data

US 2022/0101706 A1 Mar. 31, 2022

Related U.S. Application Data

(60) Provisional application No. 63/083,740, filed on Sep. 25, 2020.

(51) Int. Cl.
*G08B 13/24* (2006.01)
*E05B 39/00* (2006.01)
(Continued)

(52) U.S. Cl.
CPC .......... *G08B 13/2494* (2013.01); *E05B 39/00* (2013.01); *E05B 63/0017* (2013.01); *G08B 25/00* (2013.01); *E05B 47/0001* (2013.01)

(58) Field of Classification Search
CPC ............................ G08B 13/2494; G08B 25/00
See application file for complete search history.

(56) References Cited

U.S. PATENT DOCUMENTS 2,680,177 A 6/1954 Rosenthal
3,249,915 A 5/1966 Koerner
(Continued)

FOREIGN PATENT DOCUMENTS

AU 2014236999 A1 10/2015
CA 2676196 A1 7/2008
(Continued)

OTHER PUBLICATIONS

International Search Report and Written Opinion for International Application No. PCT/US2014/026254, dated Nov. 18, 2014.
(Continued)

*Primary Examiner* — Hoi C Lau

(74) *Attorney, Agent, or Firm* — Calfee, Halter & Griswold LLP

(57) ABSTRACT

In some embodiments, a method of determining whether a door is ajar may include determining an orientation of a door lock of the door, and, based on the orientation of the door lock, analyzing at least one signal from at least one of two or more proximity sensors of the door lock. The method may further include determining whether the door is ajar based at least in part on a result of the analyzing of the at least one signal. In some embodiments, a method of determining a status of a door may include receiving a first signal from a first magnetometer disposed within a door lock of the door,
(Continued)

receiving a second signal from a second magnetometer disposed within the door lock of the door, and detecting, based on a result of an evaluation of both the first signal and the second signal, a possible attack on the door.

20 Claims, 10 Drawing Sheets

(51) Int. Cl.
*E05B 63/00* (2006.01)
*G08B 25/00* (2006.01)
*E05B 47/00* (2006.01)

(56) References Cited

U.S. PATENT DOCUMENTS 3,898,976 A 8/1975 Coffman, Jr.
4,849,749 A * 7/1989 Fukamachi ........ G07C 9/00738 340/5.67
4,869,086 A 9/1989 Richards
D316,365 S 4/1991 Hansen et al.
5,245,329 A 9/1993 Gokcebay
5,306,407 A 4/1994 Hauzer et al.
5,407,035 A 4/1995 Cole et al.
D361,985 S 9/1995 Snyder
5,594,430 A 1/1997 Cutter et al.
5,695,048 A 12/1997 Tseng
5,712,626 A 1/1998 Andreou et al.
5,774,058 A 6/1998 Henry et al.
5,841,361 A 11/1998 Hoffman
5,903,225 A 5/1999 Schmitt et al.
5,933,086 A 8/1999 Tischendorf et al.
5,979,199 A 11/1999 Elpern et al.
6,032,500 A 3/2000 Collard, Jr. et al.
6,089,058 A 7/2000 Elpern et al.
D437,771 S 2/2001 Barnes et al.
6,196,936 B1 3/2001 Meckel
6,215,781 B1 4/2001 Kato et al.
6,282,931 B1 9/2001 Padiak et al.
6,323,846 B1 11/2001 Westerman et al.
6,334,636 B1 1/2002 Huang et al.
6,360,573 B1 3/2002 Ming-Chih
D456,689 S 5/2002 Nakamaru
6,407,520 B1 6/2002 Kleefeldt et al.
6,418,764 B1 7/2002 Lerchner
6,422,457 B1 7/2002 Frich et al.
6,472,993 B1 10/2002 Addy
6,568,726 B1 5/2003 Caspi et al.
6,570,557 B1 5/2003 Westerman et al.
6,580,871 B1 6/2003 Proidl
6,612,415 B2 9/2003 Yamane
6,624,739 B1 9/2003 Stobbe
6,677,932 B1 1/2004 Westerman
6,729,169 B2 5/2004 Moore
6,891,479 B1 5/2005 Eccleston
6,910,301 B2 6/2005 Kalempa et al.
D507,171 S 7/2005 Sykes
6,961,763 B1 11/2005 Wang et al.
6,967,562 B2 11/2005 Menard et al.
6,972,660 B1 12/2005 Montgomery, Jr. et al.
7,127,083 B2 10/2006 Han et al.
7,248,836 B2 7/2007 Taylor
7,252,311 B2 8/2007 Pratt et al.
D559,077 S 1/2008 Samhammer et al.
7,351,910 B1 4/2008 Magisano et al.
7,373,795 B2 5/2008 Kilbourne
D576,019 S 9/2008 Kim
7,420,456 B2 9/2008 Fisher
D578,375 S 10/2008 Samhammer et al.
7,439,850 B2 10/2008 Boulard et al.
7,520,152 B2 4/2009 Sabo et al.
7,614,008 B2 11/2009 Ording
7,619,529 B2 11/2009 Goff et al.
7,633,076 B2 12/2009 Huppi et al.
7,643,056 B2 1/2010 Silsby
7,653,883 B2 1/2010 Hotelling et al.
7,657,849 B2 2/2010 Chaudhri et al.
7,663,607 B2 2/2010 Hotelling et al.
7,734,249 B1 6/2010 Mitchell, Jr. et al.
7,810,852 B2 10/2010 Alacqua et al.
7,844,914 B2 11/2010 Andre et al.
7,872,577 B2 1/2011 Frolov
7,891,222 B2 2/2011 Ratkus et al.
8,006,002 B2 8/2011 Kalayjian et al.
8,019,353 B1 9/2011 Smithey et al.
8,024,186 B1 9/2011 De Bonet
8,035,478 B2 10/2011 Lee
8,122,645 B2 2/2012 Theile et al.
8,239,784 B2 8/2012 Hotelling et al.
8,269,627 B2 9/2012 Gore et al.
8,279,180 B2 10/2012 Hotelling et al.
8,310,365 B2 11/2012 Siegler, II et al.
8,325,039 B2 12/2012 Picard et al.
8,347,720 B2 1/2013 De Los Santos et al.
8,351,789 B2 1/2013 Wagener et al.
8,405,387 B2 3/2013 Novak et al.
D682,656 S 5/2013 Cramer et al.
D683,205 S 5/2013 Cramer et al.
8,445,779 B1 5/2013 Gretz
8,476,577 B2 7/2013 Nagahama et al.
8,479,122 B2 7/2013 Hotelling et al.
8,498,572 B1 7/2013 Schooley et al.
8,522,596 B2 9/2013 Avery
8,525,102 B2 9/2013 Augustyniak et al.
8,533,144 B1 9/2013 Reeser et al.
8,542,189 B2 9/2013 Milne et al.
8,544,326 B2 10/2013 Je
8,586,902 B2 11/2013 Verfuerth
8,600,430 B2 12/2013 Herz et al.
8,653,982 B2 2/2014 Yulkowski et al.
8,671,723 B2 3/2014 Dayanikli et al.
8,689,594 B2 4/2014 Yanar et al.
8,826,708 B2 9/2014 Lopes
8,864,049 B2 10/2014 Nolte et al.
8,872,915 B1 10/2014 Scalisi et al.
8,896,416 B1 11/2014 Lundy et al.
8,918,208 B1 12/2014 Hickman et al.
9,000,916 B2 4/2015 Meeker et al.
9,024,759 B2 5/2015 Uyeda et al.
9,049,352 B2 6/2015 Scalisi et al.
9,057,210 B2 6/2015 Dumas et al.
D733,522 S 7/2015 Kim et al.
9,113,051 B1 8/2015 Scalisi
9,187,929 B2 11/2015 Webb et al.
9,222,282 B2 12/2015 Russo et al.
9,251,679 B2 2/2016 Wandel et al.
9,322,194 B2 4/2016 Cheng et al.
9,322,201 B1 4/2016 Cheng et al.
9,326,094 B2 4/2016 Johnson et al.
D755,605 S 5/2016 Kraus et al.
9,359,794 B2 6/2016 Cheng
9,382,739 B1 7/2016 Johnson et al.
9,396,598 B2 7/2016 Daniel-Wayman et al.
D764,461 S 8/2016 Romanoff et al.
D764,462 S 8/2016 Romanoff et al.
D764,463 S 8/2016 Dwivedula et al.
9,447,609 B2 9/2016 Johnson et al.
9,454,893 B1 9/2016 Warren et al.
D768,463 S 10/2016 Kraus et al.
9,470,017 B1 10/2016 Cheng et al.
9,470,018 B1 10/2016 Cheng et al.
9,512,644 B2 * 12/2016 Lambrou ............ E05B 47/0012
9,514,585 B2 12/2016 Ahearn et al.
9,528,294 B2 12/2016 Johnson et al.
9,528,296 B1 12/2016 Cheng et al.
9,530,262 B2 12/2016 Johnson
9,530,295 B2 12/2016 Johnson
9,534,420 B1 1/2017 Cheng et al.
D778,138 S 2/2017 Meyerhoffer
D779,302 S 2/2017 Lizotte
D779,305 S 2/2017 Ku
9,574,372 B2 2/2017 Johnson et al.
9,613,476 B2 4/2017 Johnson

(56) References Cited

U.S. PATENT DOCUMENTS

| | | | |
|---|---|---|---|
| 9,624,695 B1 | 4/2017 | Cheng et al. | |
| D786,653 S | 5/2017 | Oliva Camacho et al. | |
| 9,640,053 B2 | 5/2017 | Siann et al. | |
| 9,644,398 B1 | 5/2017 | Cheng et al. | |
| 9,644,399 B2 | 5/2017 | Johnson et al. | |
| 9,644,400 B1 | 5/2017 | Cheng et al. | |
| 9,647,996 B2 | 5/2017 | Johnson et al. | |
| 9,652,917 B2 | 5/2017 | Johnson et al. | |
| 9,683,391 B2 | 6/2017 | Johnson et al. | |
| 9,683,392 B1 | 6/2017 | Cheng et al. | |
| 9,685,015 B2 | 6/2017 | Johnson | |
| 9,685,017 B2 | 6/2017 | Johnson | |
| 9,685,018 B2 | 6/2017 | Johnson | |
| 9,691,198 B2 | 6/2017 | Cheng et al. | |
| D790,950 S | 7/2017 | Kraus et al. | |
| 9,695,616 B2 | 7/2017 | Johnson et al. | |
| 9,704,314 B2 | 7/2017 | Johnson et al. | |
| 9,704,320 B2 | 7/2017 | Johnson et al. | |
| 9,706,365 B2 | 7/2017 | Johnson et al. | |
| D795,041 S | 8/2017 | Oliva Camacho et al. | |
| D795,109 S | 8/2017 | Olodort et al. | |
| 9,719,278 B2 * | 8/2017 | Taylor | E05B 63/0065 |
| 9,725,927 B1 | 8/2017 | Cheng | |
| 9,727,328 B2 | 8/2017 | Johnson | |
| 9,728,023 B2 | 8/2017 | Johnson | |
| 9,761,073 B2 | 9/2017 | Cheng et al. | |
| 9,761,074 B2 | 9/2017 | Cheng et al. | |
| 9,767,632 B2 | 9/2017 | Johnson | |
| 9,769,435 B2 | 9/2017 | Scalisi et al. | |
| 9,790,736 B2 | 10/2017 | Kincaid et al. | |
| 9,818,247 B2 | 11/2017 | Johnson | |
| 9,885,588 B2 * | 2/2018 | Misfatto | E05B 39/00 |
| 9,916,746 B2 | 3/2018 | Johnson et al. | |
| 9,922,481 B2 | 3/2018 | Johnson et al. | |
| 10,006,929 B2 * | 6/2018 | Ten Kate | G08B 13/08 |
| 10,017,963 B2 | 7/2018 | Johnson et al. | |
| 10,140,828 B2 | 11/2018 | Johnson et al. | |
| 10,181,232 B2 | 1/2019 | Cheng et al. | |
| 10,198,884 B2 | 2/2019 | Johnson | |
| D848,891 S | 5/2019 | Paredes | |
| 10,344,501 B2 | 7/2019 | Chang | |
| D867,104 S | 11/2019 | Morstatt et al. | |
| D887,248 S | 6/2020 | Laurans et al. | |
| 10,697,203 B1 * | 6/2020 | Gokcebay | E05B 63/0056 |
| D897,879 S | 10/2020 | Yang | |
| D906,086 S | 12/2020 | Qinggui | |
| D906,783 S | 1/2021 | Jung et al. | |
| D912,492 S | 3/2021 | Singh et al. | |
| 10,970,983 B2 | 4/2021 | Johnson et al. | |
| D922,967 S | 6/2021 | Altonen et al. | |
| 11,043,055 B2 | 6/2021 | Johnson et al. | |
| 11,091,936 B2 * | 8/2021 | Beck | E05B 17/22 |
| D937,656 S | 12/2021 | He | |
| D942,958 S | 2/2022 | Maier et al. | |
| 11,319,727 B1 * | 5/2022 | Tobias | E05B 45/06 |
| D959,954 S | 8/2022 | He | |
| 11,417,182 B2 * | 8/2022 | Shamai | G08B 13/08 |
| 11,527,121 B2 | 12/2022 | Johnson et al. | |
| D976,733 S | 1/2023 | Li et al. | |
| D980,040 S | 3/2023 | Lovejoy et al. | |
| D985,360 S | 5/2023 | Dai | |
| 11,881,066 B2 * | 1/2024 | Ross | E05B 47/0038 |
| 2002/0015024 A1 | 2/2002 | Westerman et al. | |
| 2002/0099945 A1 | 7/2002 | McLintock et al. | |
| 2002/0117868 A1 | 8/2002 | Bates et al. | |
| 2002/0138767 A1 | 9/2002 | Hamid et al. | |
| 2002/0196771 A1 | 12/2002 | Vij et al. | |
| 2003/0160681 A1 | 8/2003 | Menard et al. | |
| 2003/0167693 A1 | 9/2003 | Mainini | |
| 2004/0003257 A1 | 1/2004 | Mitchell | |
| 2004/0012352 A1 | 1/2004 | Kachouh et al. | |
| 2004/0075532 A1 | 4/2004 | Ueda et al. | |
| 2004/0212678 A1 | 10/2004 | Cooper et al. | |
| 2004/0215910 A1 | 10/2004 | Okaue et al. | |
| 2004/0236918 A1 | 11/2004 | Okaue et al. | |
| 2004/0237609 A1 | 12/2004 | Hosselet | |
| 2004/0243779 A1 | 12/2004 | Okaue et al. | |
| 2005/0007451 A1 | 1/2005 | Chiang | |
| 2005/0029345 A1 | 2/2005 | Waterhouse et al. | |
| 2005/0088145 A1 | 4/2005 | Loch | |
| 2005/0179517 A1 | 8/2005 | Harms et al. | |
| 2005/0212750 A1 | 9/2005 | Marvit et al. | |
| 2005/0212752 A1 | 9/2005 | Marvit et al. | |
| 2005/0248444 A1 | 11/2005 | Joao | |
| 2005/0252739 A1 | 11/2005 | Callahan et al. | |
| 2005/0286466 A1 | 12/2005 | Tagg et al. | |
| 2006/0026536 A1 | 2/2006 | Hotelling et al. | |
| 2006/0033724 A1 | 2/2006 | Chaudhri et al. | |
| 2006/0158144 A1 | 7/2006 | Theile et al. | |
| 2006/0164208 A1 | 7/2006 | Schaffzin et al. | |
| 2006/0193262 A1 | 8/2006 | McSheffrey et al. | |
| 2006/0197753 A1 | 9/2006 | Hotelling | |
| 2006/0267409 A1 | 11/2006 | Mullet et al. | |
| 2006/0283219 A1 | 12/2006 | Bendz et al. | |
| 2007/0056338 A1 | 3/2007 | Sabo et al. | |
| 2007/0090843 A1 | 4/2007 | De Doncker et al. | |
| 2007/0150842 A1 | 6/2007 | Chaudhri et al. | |
| 2007/0188307 A1 | 8/2007 | Lai et al. | |
| 2007/0229350 A1 | 10/2007 | Scalisi et al. | |
| 2007/0246396 A1 | 10/2007 | Brollier | |
| 2008/0011032 A1 | 1/2008 | Groff | |
| 2008/0047200 A1 | 2/2008 | Krause et al. | |
| 2008/0055241 A1 | 3/2008 | Goldenberg et al. | |
| 2008/0125965 A1 | 5/2008 | Carani et al. | |
| 2008/0129498 A1 | 6/2008 | Howarter et al. | |
| 2008/0211775 A1 | 9/2008 | Hotelling et al. | |
| 2008/0223093 A1 | 9/2008 | Amir | |
| 2008/0236214 A1 | 10/2008 | Han | |
| 2008/0238669 A1 | 10/2008 | Linford | |
| 2008/0297602 A1 | 12/2008 | Chang | |
| 2008/0309624 A1 | 12/2008 | Hotelling | |
| 2009/0006736 A1 | 1/2009 | Pantos et al. | |
| 2009/0029672 A1 | 1/2009 | Manz | |
| 2009/0066320 A1 | 3/2009 | Posey | |
| 2009/0085878 A1 | 4/2009 | Heubel et al. | |
| 2009/0128329 A1 | 5/2009 | Sato et al. | |
| 2009/0140858 A1 | 6/2009 | Gore et al. | |
| 2009/0167488 A1 | 7/2009 | Hays et al. | |
| 2009/0180933 A1 | 7/2009 | Kauling et al. | |
| 2009/0193859 A1 | 8/2009 | Kwon et al. | |
| 2009/0217596 A1 | 9/2009 | Neundorf et al. | |
| 2009/0250552 A1 | 10/2009 | Kearns et al. | |
| 2009/0256676 A1 | 10/2009 | Piccirillo et al. | |
| 2009/0267732 A1 | 10/2009 | Chauvin et al. | |
| 2009/0273438 A1 | 11/2009 | Sultan et al. | |
| 2010/0000750 A1 | 1/2010 | Andel | |
| 2010/0070281 A1 | 3/2010 | Conkie et al. | |
| 2010/0089109 A1 | 4/2010 | Bliding et al. | |
| 2010/0127517 A1 | 5/2010 | Bliding et al. | |
| 2010/0141381 A1 | 6/2010 | Bliding et al. | |
| 2010/0141762 A1 | 6/2010 | Siann et al. | |
| 2010/0145164 A1 | 6/2010 | Howell | |
| 2010/0156809 A1 | 6/2010 | Nutaro et al. | |
| 2010/0283579 A1 | 11/2010 | Kraus et al. | |
| 2010/0306549 A1 | 12/2010 | Ullmann | |
| 2010/0325194 A1 | 12/2010 | Williamson et al. | |
| 2011/0148631 A1 | 1/2011 | Lanham et al. | |
| 2011/0043362 A1 | 2/2011 | Reibel | |
| 2011/0056253 A1 | 3/2011 | Greiner et al. | |
| 2011/0082634 A1 | 4/2011 | Povirk et al. | |
| 2011/0100076 A1 | 5/2011 | Weinstein | |
| 2011/0109678 A1 | 5/2011 | Schwartz et al. | |
| 2011/0148575 A1 | 6/2011 | Sobecki et al. | |
| 2011/0154740 A1 | 6/2011 | Matsumoto et al. | |
| 2011/0185554 A1 | 8/2011 | Huang et al. | |
| 2011/0215597 A1 | 9/2011 | Weum | |
| 2011/0265528 A1 | 11/2011 | Saari | |
| 2011/0276207 A1 | 11/2011 | Falkenstein | |
| 2011/0277520 A1 | 11/2011 | Nunuparov | |
| 2011/0285501 A1 | 11/2011 | Chen | |
| 2012/0008526 A1 | 1/2012 | Borghei | |
| 2012/0011905 A1 | 1/2012 | Gui | |
| 2012/0068817 A1 | 3/2012 | Fisher | |
| 2012/0073482 A1 | 3/2012 | Meeker et al. | |

(56) References Cited

U.S. PATENT DOCUMENTS

2012/0089258 A1 4/2012 Wong et al.
2012/0092502 A1 4/2012 Knasel et al.
2012/0199374 A1 8/2012 Herth
2012/0257615 A1 10/2012 Eskildsen et al.
2012/0280783 A1 11/2012 Gerhardt et al.
2012/0280789 A1 11/2012 Gerhardt et al.
2012/0280790 A1 11/2012 Gerhardt et al.
2012/0306655 A1 12/2012 Tan et al.
2012/0319827 A1 12/2012 Pance et al.
2013/0010120 A1 1/2013 Nnoruka
2013/0023278 A1 1/2013 Chin
2013/0038550 A1 2/2013 Chien et al.
2013/0050106 A1 2/2013 Chung et al.
2013/0062892 A1 3/2013 Chow et al.
2013/0063138 A1 3/2013 Takahashi et al.
2013/0064378 A1 3/2013 Chuang
2013/0067969 A1 3/2013 Webb et al.
2013/0076048 A1 3/2013 Aerts et al.
2013/0126666 A1 5/2013 Brown
2013/0138826 A1 5/2013 Ling et al.
2013/0154823 A1 6/2013 Ostrer et al.
2013/0166202 A1 6/2013 Bandyopadhyay et al.
2013/0176107 A1 7/2013 Dumas et al.
2013/0178233 A1 7/2013 McCoy et al.
2013/0192318 A1 8/2013 Yanar et al.
2013/0207773 A1 8/2013 Hathaway et al.
2013/0229274 A1 9/2013 Kumar et al.
2013/0237193 A1 9/2013 Dumas et al.
2013/0265162 A1 10/2013 Buckley et al.
2013/0269255 A1 10/2013 De Coi et al.
2013/0271261 A1 10/2013 Ribas et al.
2013/0307670 A1 11/2013 Ramaci
2013/0340491 A1* 12/2013 Lambrou ............ E05B 47/0012 70/277
2014/0020295 A1 1/2014 Bonahoom et al.
2014/0021725 A1 1/2014 Baty et al.
2014/0028443 A1 1/2014 Ebner
2014/0033773 A1 2/2014 Myers et al.
2014/0039366 A1 2/2014 Joseph
2014/0047878 A1 2/2014 Zheng et al.
2014/0049366 A1 2/2014 Vasquez
2014/0049369 A1 2/2014 Ahearn et al.
2014/0051355 A1 2/2014 Ahearn et al.
2014/0051425 A1 2/2014 Ahearn et al.
2014/0052783 A1 2/2014 Swatsky et al.
2014/0062466 A1* 3/2014 Thibault .................. G01B 7/14 324/207.22
2014/0067452 A1 3/2014 Anderson et al.
2014/0125599 A1 5/2014 Seeley
2014/0145666 A1 5/2014 Swanson
2014/0159865 A1 6/2014 Eto et al.
2014/0165673 A1 6/2014 Tyner et al.
2014/0189758 A1 7/2014 Kozlowski
2014/0218173 A1 8/2014 Long et al.
2014/0239647 A1 8/2014 Jadallah et al.
2014/0265359 A1 9/2014 Cheng et al.
2014/0267736 A1 9/2014 DeLean
2014/0267740 A1 9/2014 Almomani et al.
2014/0292481 A1 10/2014 Dumas et al.
2014/0324590 A1 10/2014 Kong et al.
2014/0340196 A1 11/2014 Myers et al.
2014/0354820 A1 12/2014 Danialian et al.
2014/0365773 A1 12/2014 Gerhardt et al.
2014/0375422 A1 12/2014 Huber et al.
2015/0008685 A1 1/2015 Beck
2015/0015513 A1 1/2015 Kwak et al.
2015/0022466 A1 1/2015 Levesque
2015/0027178 A1 1/2015 Scalisi
2015/0049189 A1 2/2015 Yau et al.
2015/0049191 A1 2/2015 Scalisi et al.
2015/0065167 A1 3/2015 Scalisi
2015/0096341 A1 4/2015 Overgaard
2015/0102609 A1 4/2015 Johnson et al.
2015/0102610 A1 4/2015 Johnson et al.
2015/0102927 A1 4/2015 Johnson et al.
2015/0109104 A1 4/2015 Fadell et al.
2015/0116075 A1 4/2015 Cregg et al.
2015/0116080 A1 4/2015 Cregg et al.
2015/0116082 A1 4/2015 Cregg et al.
2015/0116490 A1 4/2015 Scalisi
2015/0128667 A1 5/2015 Yoon et al.
2015/0145796 A1 5/2015 Lee
2015/0156031 A1 6/2015 Fadell et al.
2015/0160770 A1 6/2015 Stewart et al.
2015/0170448 A1 6/2015 Robfogel et al.
2015/0185311 A1 7/2015 Lohier
2015/0194000 A1 7/2015 Schoenfelder et al.
2015/0199860 A1 7/2015 Hong et al.
2015/0211259 A1 7/2015 Dumas et al.
2015/0213658 A1 7/2015 Dumas et al.
2015/0213663 A1 7/2015 Dumas et al.
2015/0216326 A1 8/2015 Artwohl et al.
2015/0218850 A1 8/2015 Uyeda et al.
2015/0218857 A1 8/2015 Hamada
2015/0222517 A1 8/2015 McLaughlin et al.
2015/0227201 A1 8/2015 Nakao
2015/0227227 A1 8/2015 Myers et al.
2015/0228167 A1 8/2015 Scalisi et al.
2015/0233153 A1 8/2015 Smart et al.
2015/0233154 A1 8/2015 Smart et al.
2015/0240521 A1 8/2015 Vaknin et al.
2015/0240531 A1 8/2015 Blust et al.
2015/0241974 A1 8/2015 Takeda
2015/0242007 A1 8/2015 Iwaizumi et al.
2015/0242036 A1 8/2015 Heidari
2015/0242038 A1 8/2015 Steiner et al.
2015/0242045 A1 8/2015 Choi et al.
2015/0242047 A1 8/2015 Zafiris
2015/0242074 A1 8/2015 Iwamoto
2015/0242113 A1 8/2015 Nguyen Thien et al.
2015/0242115 A1 8/2015 Gao et al.
2015/0242696 A1 8/2015 Kim et al.
2015/0259949 A1 9/2015 Cheng
2015/0287254 A1 10/2015 Ribas et al.
2015/0300048 A1 10/2015 Yen et al.
2015/0302738 A1 10/2015 Geerlings et al.
2015/0308157 A1 10/2015 Lin et al.
2015/0348399 A1 12/2015 Cree et al.
2015/0356345 A1 12/2015 Velozo et al.
2015/0363989 A1 12/2015 Scalisi
2016/0024831 A1 1/2016 Houser et al.
2016/0032621 A1 2/2016 Johnson et al.
2016/0036594 A1 2/2016 Conrad et al.
2016/0037306 A1 2/2016 Johnson et al.
2016/0040452 A1 2/2016 Ku
2016/0042581 A1 2/2016 Kumar et al.
2016/0047145 A1 2/2016 Johnson et al.
2016/0048370 A1 2/2016 Zenoff
2016/0049024 A1 2/2016 Johnson et al.
2016/0049025 A1 2/2016 Johnson
2016/0049026 A1 2/2016 Johnson
2016/0050515 A1 2/2016 Johnson
2016/0055694 A1 2/2016 Saeedi et al.
2016/0055695 A1 2/2016 Saeedi et al.
2016/0092954 A1 3/2016 Bassett et al.
2016/0116510 A1 4/2016 Kalous et al.
2016/0127874 A1 5/2016 Kingsmill et al.
2016/0133071 A1 5/2016 Henderson
2016/0134932 A1 5/2016 Karp et al.
2016/0180618 A1 6/2016 Ho et al.
2016/0180621 A1 6/2016 Desinor, Jr.
2016/0189453 A1 6/2016 Johnson et al.
2016/0189454 A1 6/2016 Johnson et al.
2016/0189459 A1 6/2016 Johnson et al.
2016/0189502 A1 6/2016 Johnson et al.
2016/0189503 A1 6/2016 Johnson et al.
2016/0189511 A1* 6/2016 Peterson ................. E05B 47/06 340/545.3
2016/0208541 A1 7/2016 Goto
2016/0225240 A1* 8/2016 Voddhi .................... H04W 4/38
2016/0284170 A1 9/2016 Kasmir et al.
2016/0284181 A1 9/2016 Johnson
2016/0290009 A1* 10/2016 Feirer .................... G08B 13/08
2016/0291966 A1 10/2016 Johnson

(56) References Cited

U.S. PATENT DOCUMENTS

| | | | | |
|---|---|---|---|---|
| 2016/0300476 | A1 | 10/2016 | Kasmir et al. | |
| 2016/0319569 | A1 | 11/2016 | Johnson et al. | |
| 2016/0319571 | A1 | 11/2016 | Johnson | |
| 2016/0326775 | A1 | 11/2016 | Johnson | |
| 2016/0328901 | A1 | 11/2016 | Johnson | |
| 2016/0330413 | A1 | 11/2016 | Scalisi et al. | |
| 2016/0343181 | A1 | 11/2016 | Cheng et al. | |
| 2016/0343188 | A1 | 11/2016 | Johnson | |
| 2016/0348398 | A1 | 12/2016 | Telljohann et al. | |
| 2016/0358433 | A1 | 12/2016 | Johnson | |
| 2016/0358437 | A1 | 12/2016 | Johnson et al. | |
| 2017/0002586 | A1* | 1/2017 | Lee | E05B 39/00 |
| 2017/0011570 | A1 | 1/2017 | Johnson et al. | |
| 2017/0016249 | A1 | 1/2017 | Johnson et al. | |
| 2017/0019378 | A1 | 1/2017 | Johnson et al. | |
| 2017/0032597 | A1 | 2/2017 | Johnson | |
| 2017/0032602 | A1 | 2/2017 | Cheng et al. | |
| 2017/0053468 | A1 | 2/2017 | Johnson | |
| 2017/0053469 | A1 | 2/2017 | Cheng et al. | |
| 2017/0109952 | A1 | 4/2017 | Johnson | |
| 2017/0169679 | A1 | 6/2017 | Johnson et al. | |
| 2017/0193724 | A1 | 7/2017 | Johnson et al. | |
| 2017/0198496 | A1 | 7/2017 | Beck | |
| 2017/0228603 | A1 | 8/2017 | Johnson | |
| 2017/0243420 | A1 | 8/2017 | Lien | |
| 2017/0243455 | A1 | 8/2017 | Johnson et al. | |
| 2017/0263065 | A1 | 9/2017 | Johnson | |
| 2018/0038159 | A1 | 2/2018 | Kincaid et al. | |
| 2018/0040183 | A1* | 2/2018 | Cheng | G07C 9/00309 |
| 2018/0073274 | A1 | 3/2018 | Johnson et al. | |
| 2018/0135336 | A1 | 5/2018 | Johnson et al. | |
| 2018/0135337 | A1 | 5/2018 | Johnson et al. | |
| 2018/0179786 | A1 | 6/2018 | Johnson | |
| 2018/0253951 | A1 | 9/2018 | Johnson et al. | |
| 2018/0261029 | A1 | 9/2018 | Johnson et al. | |
| 2018/0268675 | A1 | 9/2018 | Johnson et al. | |
| 2018/0340350 | A1 | 11/2018 | Johnson et al. | |
| 2019/0019364 | A9 | 1/2019 | Cheng et al. | |
| 2019/0040653 | A1* | 2/2019 | Baumgarte | E05B 17/22 |
| 2020/0011088 | A1* | 1/2020 | Harris | G07C 9/00309 |
| 2020/0105124 | A1* | 4/2020 | Nichols, Sr. | G08B 13/2491 |
| 2020/0279446 | A1* | 9/2020 | Hage | E05B 39/005 |
| 2021/0005036 | A1 | 1/2021 | Johnson et al. | |
| 2021/0383663 | A1* | 12/2021 | Shamai | G08B 13/08 |
| 2022/0058904 | A1* | 2/2022 | Ross | G07C 9/00722 |
| 2022/0101672 | A1* | 3/2022 | Abueshsheikh | E05B 9/08 |
| 2022/0101706 | A1* | 3/2022 | Abueshsheikh | G08B 13/2494 |

FOREIGN PATENT DOCUMENTS

| | | | |
|---|---|---|---|
| CA | 2834964 | A1 | 11/2012 |
| CA | 2905009 | A1 | 9/2014 |
| EP | 0 244 750 | A2 | 11/1987 |
| EP | 0 486 657 | A1 | 5/1992 |
| EP | 0 907 068 | A1 | 4/1999 |
| EP | 1 404 021 | A2 | 3/2004 |
| EP | 1 529 904 | A1 | 5/2005 |
| EP | 2 428 774 | A1 | 3/2012 |
| EP | 2 447 450 | A2 | 5/2012 |
| EP | 2 454 558 | A1 | 5/2012 |
| EP | 2 564 165 | A2 | 3/2013 |
| EP | 2 579 002 | A1 | 4/2013 |
| EP | 2 631 400 | A2 | 8/2013 |
| EP | 2 642 252 | A1 | 8/2013 |
| GB | 2 259 737 | A | 3/1993 |
| WO | WO 91/19986 | A1 | 12/1991 |
| WO | WO 2006/085852 | A2 | 8/2006 |
| WO | WO 2009/142596 | A1 | 11/2009 |
| WO | WO 2011/006515 | A1 | 1/2011 |
| WO | WO 2011/139682 | A2 | 11/2011 |
| WO | WO 2012/151290 | A1 | 11/2012 |
| WO | WO 2014/062321 | A1 | 4/2014 |
| WO | WO 2014/107196 | A1 | 7/2014 |
| WO | WO 2014/151692 | A2 | 9/2014 |
| WO | WO 2014/151692 | A3 | 9/2014 |
| WO | WO 2015/023737 | A1 | 2/2015 |
| WO | WO 2015/138726 | A1 | 9/2015 |
| WO | WO 2015/138740 | A1 | 9/2015 |
| WO | WO 2015/138747 | A1 | 9/2015 |
| WO | WO 2015/138755 | A1 | 9/2015 |
| WO | WO 2016/130777 | A1 | 8/2016 |
| WO | WO 2016/196025 | A1 | 12/2016 |

OTHER PUBLICATIONS

International Preliminary Report on Patentability for International Application No. PCT/US2014/026254, dated Sep. 24, 2015.

International Search Report and Written Opinion for International Application No. PCT/US2015/020180, dated Jun. 16, 2015.

International Preliminary Report on Patentability for International Application No. PCT/US2015/020180, dated Sep. 22, 2016.

International Search Report and Written Opinion for International Application No. PCT/US2015/020206, dated Jun. 29, 2015.

International Preliminary Report on Patentability for International Application No. PCT/US2015/020206, dated Sep. 22, 2016.

International Search Report and Written Opinion for International Application No. PCT/US2015/020216, dated Jun. 17, 2015.

International Preliminary Report on Patentability for International Application No. PCT/US2015/020216, dated Sep. 22, 2016.

International Search Report and Written Opinion for International Application No. PCT/US2015/020226, dated Jun. 25, 2015.

International Preliminary Report on Patentability for International Application No. PCT/US2015/020226, dated Sep. 22, 2016.

International Search Report and Written Opinion for International Application No. PCT/US2016/017508, dated Jun. 14, 2016.

International Preliminary Report on Patentability for International Application No. PCT/US2016/017508, dated Aug. 24, 2017.

International Search Report and Written Opinion for International Application No. PCT/US2016/033257, dated Aug. 22, 2016.

International Preliminary Report on Patentability for International Application No. PCT/US2016/033257, dated Dec. 14, 2017.

International Search Report and Written Opinion for International Application No. PCT/US2021/050240, dated Dec. 16, 2021.

U.S. Appl. No. 16/197,574, filed Nov. 21, 2018, Johnson.

U.S. Appl. No. 17/026,007, filed Sep. 18, 2020, Johnson et al.

U.S. Appl. No. 16/908,358, filed Jun. 22, 2020, Johnson et al.

U.S. Appl. No. 17/360,705, filed Jun. 28, 2021, Johnson et al.

U.S. Appl. No. 15/867,773, filed Jan. 11, 2018, Johnson et al.

U.S. Appl. No. 15/867,992, filed Jan. 11, 2018, Johnson et al.

U.S. Appl. No. 15/881,776, filed Jan. 28, 2018, Johnson.

U.S. Appl. No. 17/218,253, filed Mar. 31, 2021, Johnson et al.

U.S. Appl. No. 17/226,777, filed Apr. 9, 2021, Johnson et al.

U.S. Appl. No. 17/101,526, filed Nov. 23, 2020, Cheng.

U.S. Appl. No. 17/475,029, filed Sep. 14, 2021, Petty et al.

U.S. Appl. No. 17/475,061, filed Sep. 14, 2021, Petty et al.

U.S. Appl. No. 17/474,250, filed Sep. 14, 2021, Abueshsheikh et al.

PCT/US2014/026254, Nov. 18, 2014, International Search Report and Written Opinion.

PCT/US2014/026254, Sep. 24, 2015, International Preliminary Report on Patentability.

PCT/US2015/020180, Jun. 16, 2015, International Search Report and Written Opinion.

PCT/US2015/020180, Sep. 22, 2016, International Preliminary Report on Patentability.

PCT/US2015/020206, Jun. 29, 2015, International Search Report and Written Opinion.

PCT/US2015/020206, Sep. 22, 2016, International Preliminary Report on Patentability.

PCT/US2015/020216, Jun. 17, 2015, International Search Report and Written Opinion.

PCT/US2015/020216, Sep. 22, 2016, International Preliminary Report on Patentability.

PCT/US2015/020226, Jun. 25, 2015, International Search Report and Written Opinion.

PCT/US2015/020226, Sep. 22, 2016, International Preliminary Report on Patentability.

PCT/US2016/017508, Jun. 14, 2016, International Search Report and Written Opinion.

(56) References Cited

OTHER PUBLICATIONS

PCT/US2016/017508, Aug. 24, 2017, International Preliminary Report on Patentability.
PCT/US2016/033257, Aug. 22, 2016, International Search Report and Written Opinion.
PCT/US2016/033257, Dec. 14, 2017, International Preliminary Report on Patentability.
PCT/US2021/050240, Dec. 16, 2021, International Search Report and Written Opinion.
International Preliminary Report on Patentability for International Application No. PCT/US2021/050240, dated Apr. 6, 2023.
Abueshsheikh et al., Multi orientation door lock. Co-pending U.S. Appl. No. 17/474,250, filed Sep. 14, 2021.
Treger et al., Deadbolt lock system. Co-pending U.S. Appl. No. 18/084,627, filed Dec. 20, 2022.
Treger et al., Lock. Co-pending U.S. Appl. No. 29/820,190, filed Dec. 20, 2021.
Treger et al., Lock. Co-pending U.S. Appl. No. 29/820,195, filed Dec. 20, 2021.
[No Author Listed] How to install the Yale Linus Smart Lock on a compatible cylinder! YouTube. https://www.youtube.com/watch?v=Q01RuUj9D4s. Oct. 21, 2020, 2 pages.
Ratcliffe, Yale Linus Review—HomeKit enabled smart lock. HomeKitAuthority. https://www.homekitauthority.com/yale-linus-review-homekit-enabled-smart-lock/. Mar. 1, 20211, 12 pages.
PCT/US2021/050240, Apr. 6, 2023, International Preliminary Report on Patentability.
Office action from U.S. Appl. No. 17/474,250 dated Feb. 28, 2024.

* cited by examiner

DOOR LOCK WITH MAGNETOMETERS

CROSS-REFERENCE TO RELATED APPLICATIONS

The present application claims priority to U.S. Provisional Patent Application Ser. No. 63/083,740, filed Sep. 25, 2020, the entire contents of which application is incorporated by reference as set forth herein.

BACKGROUND

Deadbolt locks may be used to secure doors to prevent unauthorized entry. Some deadbolt locks can be operated manually by a knob, thumb-turn, or other handle mounted on a secured side of the door, and by a key on an unsecured side of the door. For such deadbolt locks, rotation of the handle extends or retracts a deadbolt into or out of the door. Some deadbolts may be electromechanically actuatable in addition to being manually actuatable. Such electromechanical deadbolts may include a motor that may extend or retract the bolt.

SUMMARY

In some embodiments, a method of determining a status of a door comprises receiving a first signal from a first magnetometer disposed within a door lock of the door, receiving a second signal from a second magnetometer disposed within the door lock of the door, and detecting, based on a result of an evaluation of both the first signal and the second signal, a possible attack on the door.

In some embodiments, at least one non-transitory computer-readable storage medium has encoded thereon executable instructions that, when executed, cause at least one processor to carry out a method of determining a status of a door. The method comprises receiving a first signal from a first magnetometer disposed within a door lock of the door, receiving a second signal from a second magnetometer disposed within the door lock of the door, and detecting, based on a result of an evaluation of both the first signal and the second signal, a possible attack on the door.

In some embodiments, an apparatus comprises an actuator to drive a bolt of a door lock of a door to a locked position and/or to an unlocked position, a housing configured to be mounted to the door, the actuator disposed at least in part within the housing, a first magnetometer disposed at least in part within the housing, a second magnetometer disposed at least in part within the housing, at least one processor disposed within the housing, and at least one storage medium disposed within the housing and having encoded thereon executable instructions that, when executed, cause the at least one processor to carry out a method. The method comprises receiving a first signal from the first magnetometer, receiving a second signal from the second magnetometer, and detecting an unexpected sensor state based at least in part on the first and second signals and one or more reference signals.

In some embodiments, a method of determining a status of a door comprises receiving a first signal from a first magnetometer disposed within a door lock, receiving a second signal from a second magnetometer disposed within the door lock, and determining the status of the door based on an evaluation of both the first signal and the second signal.

In some embodiments, at least one non-transitory computer-readable storage medium has encoded thereon executable instructions that, when executed, cause at least one processor to carry out a method of method of determining a status of a door. The method comprises receiving a first signal from a first magnetometer disposed within a door lock, receiving a second signal from a second magnetometer disposed within the door lock, and determining the status of the door based on an evaluation of both the first signal and the second signal.

In some embodiments, an apparatus comprises an actuator to drive a bolt of a door lock of a door to a locked position and/or to an unlocked position, a housing configured to be mounted to the door, the actuator disposed at least in part within the housing, a first magnetometer disposed at least in part within the housing, a second magnetometer disposed at least in part within the housing, at least one processor disposed within the housing, and at least one storage medium disposed within the housing and having encoded thereon executable instructions that, when executed, cause the at least one processor to carry out a method. The method comprises receiving a first signal from the first magnetometer, receiving a second signal from the second magnetometer, and determining a status of the door based at least in part on the first and second signals and one or more reference signals.

In some embodiments, a method of determining whether a door is ajar comprises determining an orientation of a door lock of the door, and, based on the orientation of the door lock, analyzing at least one signal from at least one of two or more proximity sensors of the door lock. The method further includes determining whether the door is ajar based at least in part on a result of the analyzing of the at least one signal.

In some embodiments, at least one non-transitory computer-readable storage medium has encoded thereon executable instructions that, when executed, cause at least one processor to carry out a method of determining whether a door is ajar. The method comprises determining an orientation of a door lock of the door, and, based on the orientation of the door lock, analyzing at least one signal from at least one of two or more proximity sensors of the door lock. The method further includes determining whether the door is ajar based at least in part on a result of the analyzing of the at least one signal.

In some embodiments, an apparatus comprises an actuator to drive a bolt of a door lock of a door to a locked position and/or to an unlocked position, and a housing configured to be mounted to the door. The actuator is disposed at least in part within the housing. The housing comprises a primary axis and a secondary axis perpendicular to the primary axis. The housing is longer in a first dimension along the primary axis than in a second dimension along the secondary axis. The housing comprises a first end and a second end opposite the first end along the primary axis. The actuator is configured in the housing to drive the bolt via an interface disposed proximal to the first end of the housing. The apparatus additionally comprises a first sensor disposed proximal to the first end of the housing, a second sensor disposed proximal to the second end of the housing, at least one processor disposed within the housing, and at least one storage medium disposed within the housing and having encoded thereon executable instructions that, when executed, cause the at least one processor to carry out a method. The method comprises determining an orientation of the apparatus on the door and determining whether the door is ajar based at least in part on the orientation of the apparatus on the door and one or more signals received from one or both of the first and second sensors. The apparatus is configured to be mounted to the door in any of at least four orientations. The apparatus is configured such that when mounted to the door in a first orientation of the at least four orientations, the primary axis of the housing is aligned with a height axis of the door and the first end of the housing is located closer to a top of the door than the second end. The apparatus is configured such that when mounted to the door in a second orientation of the at least four orientations, the primary axis of the housing is aligned with the height axis of the door and the second end of the housing is located closer to the top of the door than the first end. The apparatus is configured such that when mounted to the door in a third orientation of the at least four orientations, the primary axis of the housing is aligned with a width axis of the door and the first end is located to the right of the second end. The apparatus is configured such that when mounted to the door in a fourth orientation of the at least four orientations, the primary axis of the housing is aligned with the width direction of the door and the first end is located to the left of the second end.

In some embodiments, a method comprises securing a mounting plate to a door lock of a door in a selected one of at least four orientation options, and mounting a housing to the mounting plate in the selected one of the at least four orientation options, the housing having disposed therein an actuator configured to drive a bolt of the door lock to a locked position and/or to an unlocked position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

Figure 1A:
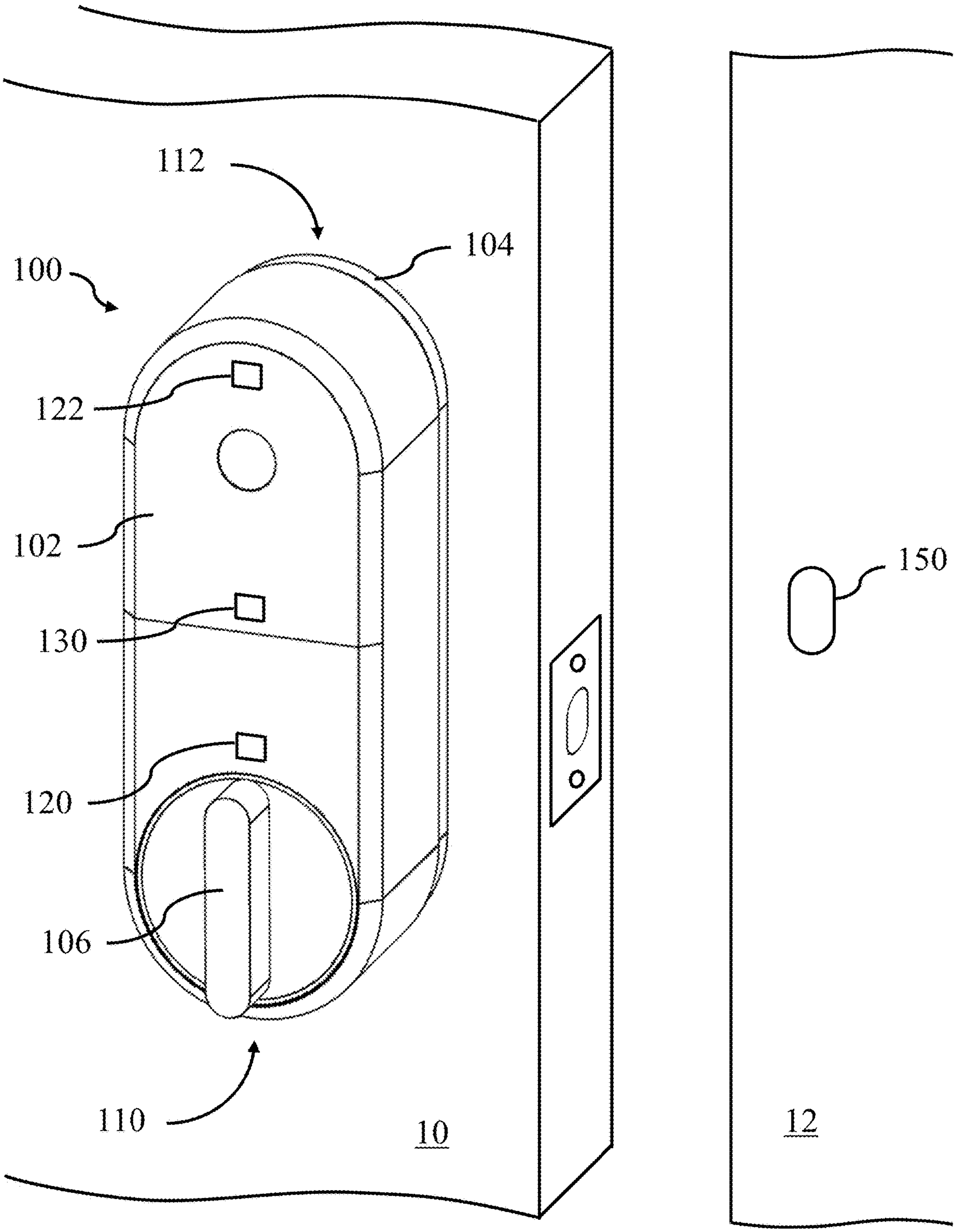
FIG. 1A is a front perspective view of one embodiment of a door lock mounted on an open door proximate to a door jamb.
Figure 2A:
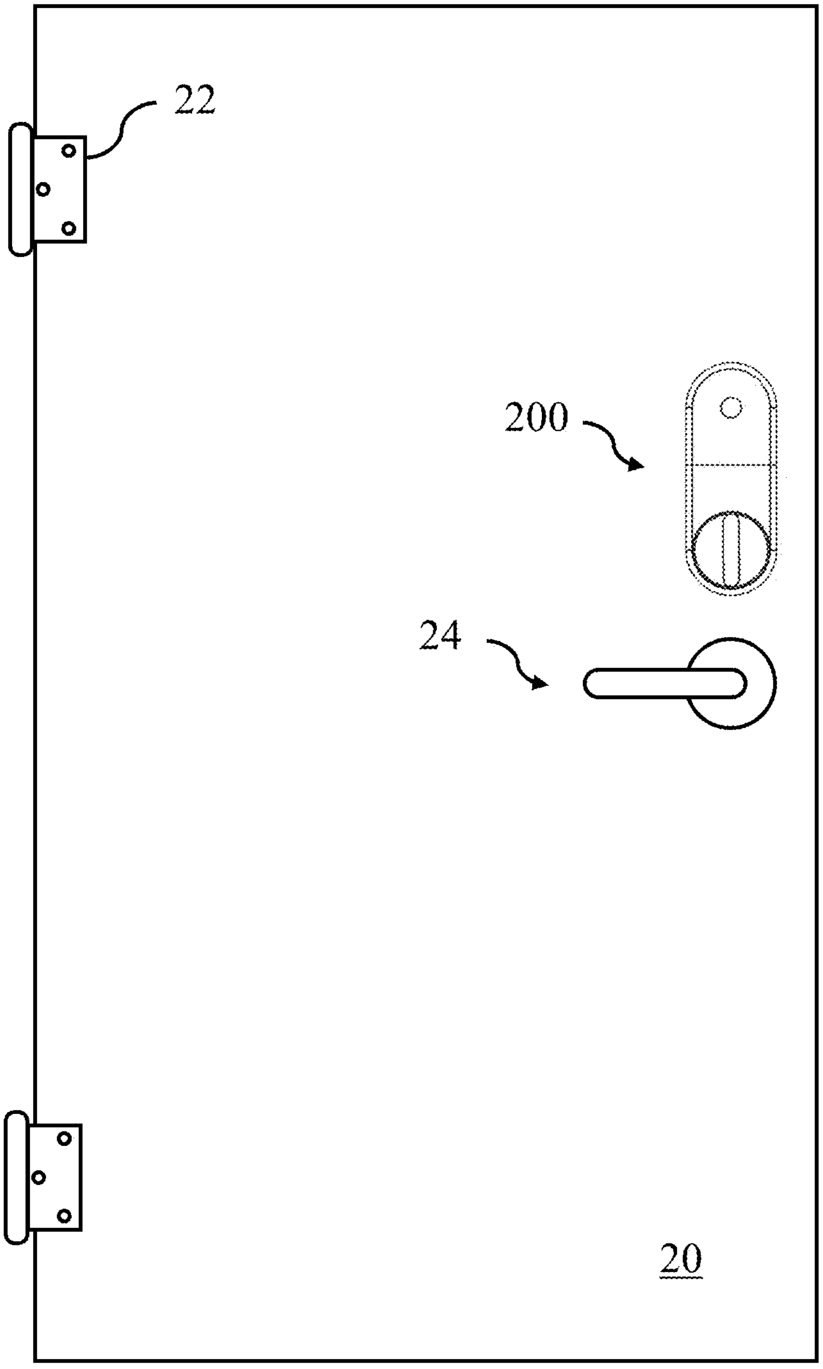
Figure 2B:
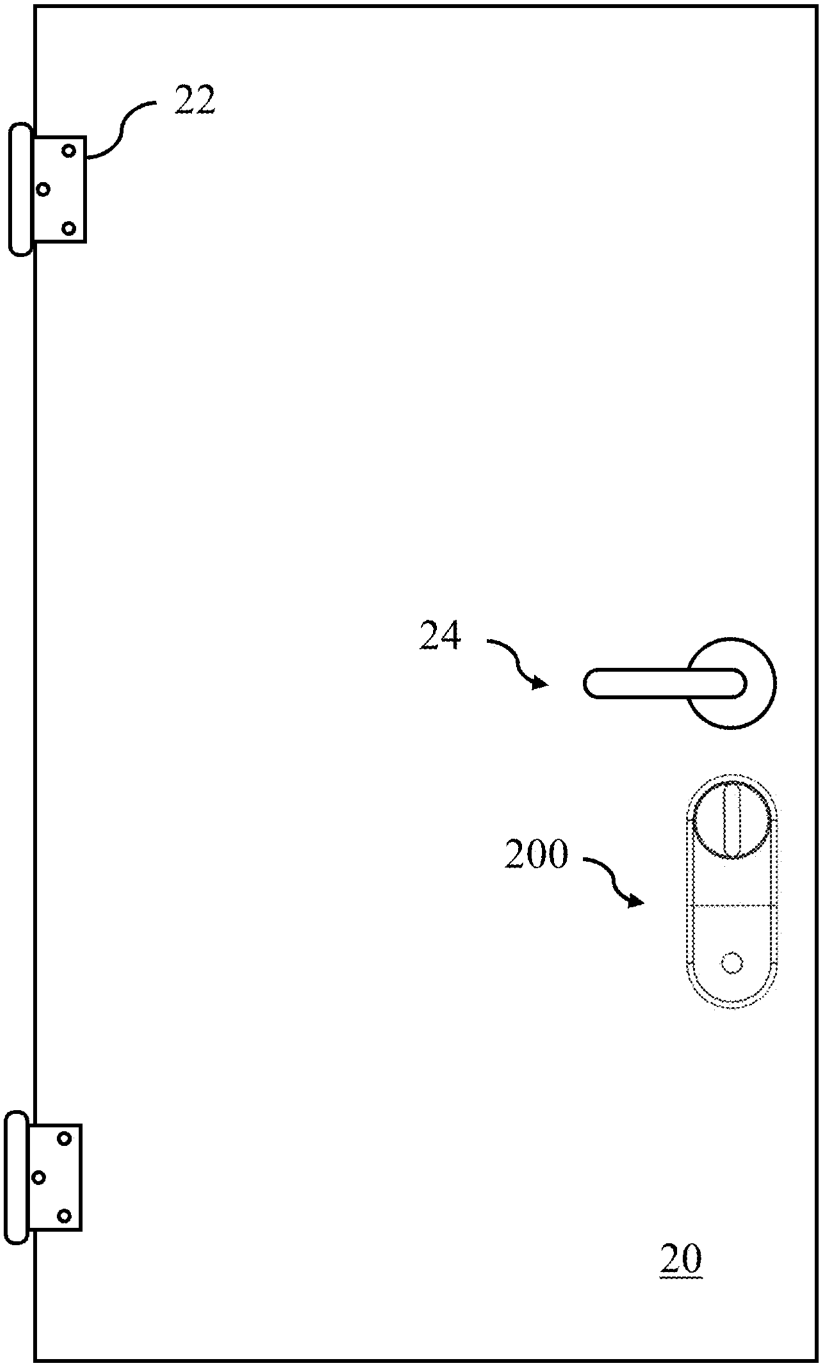
Figure 2C:
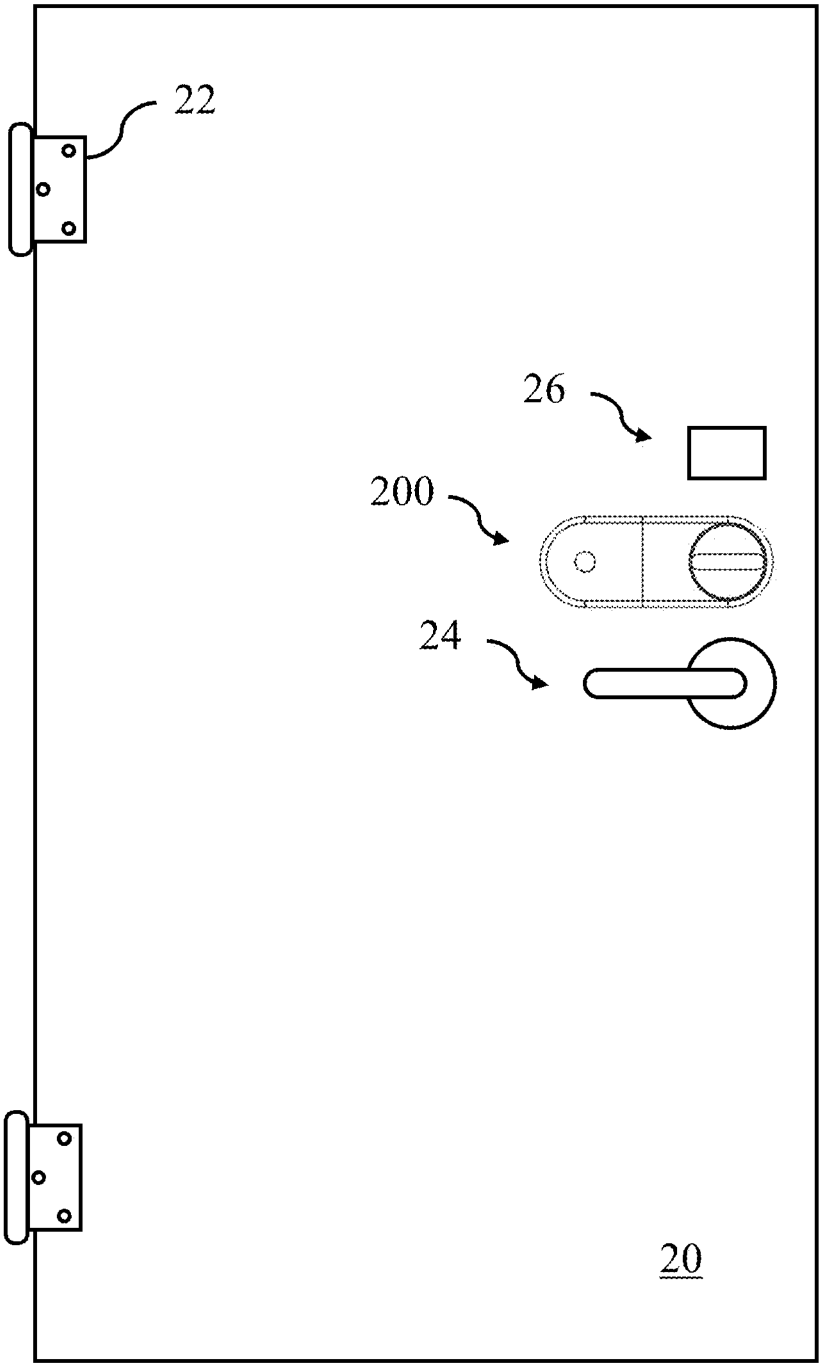
Figure 2D:
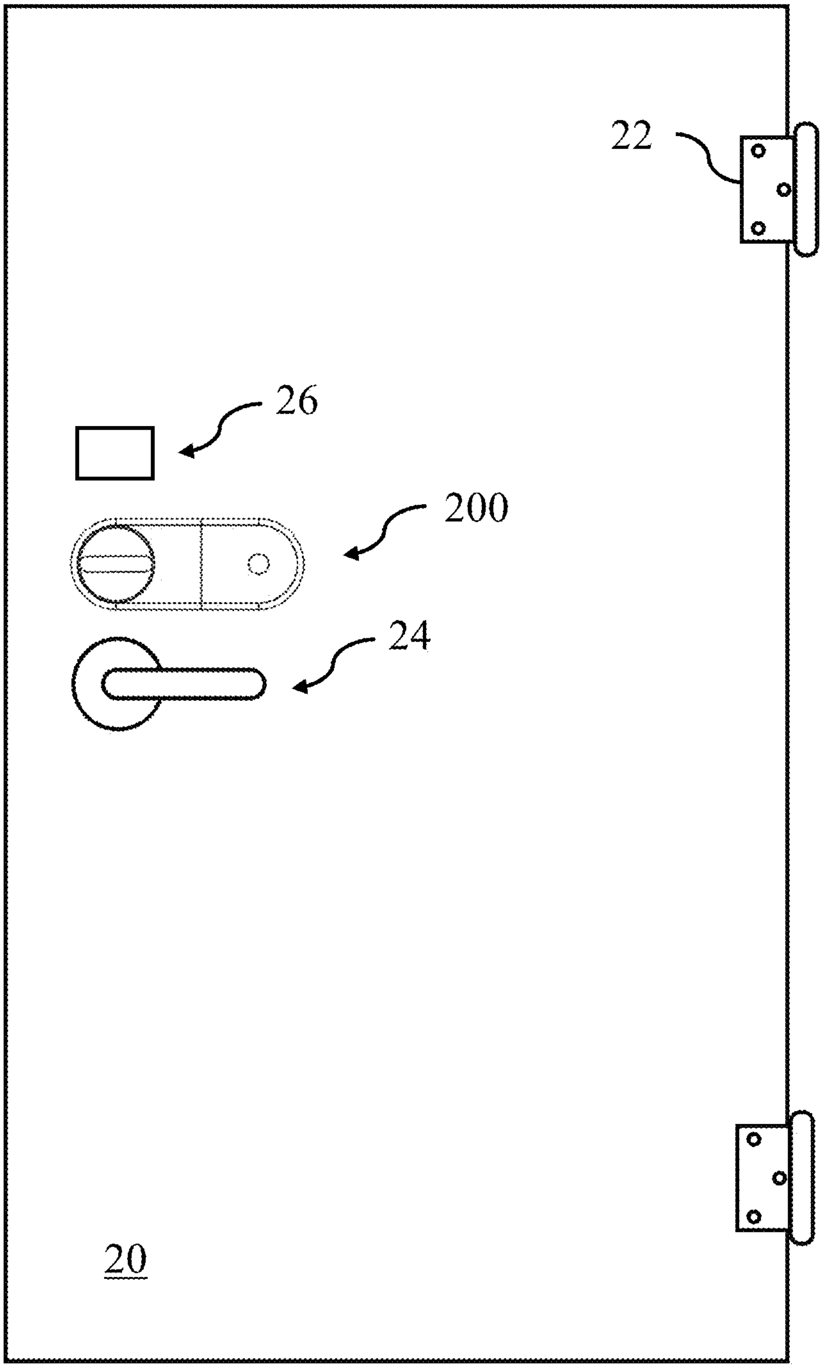
Figure 3:
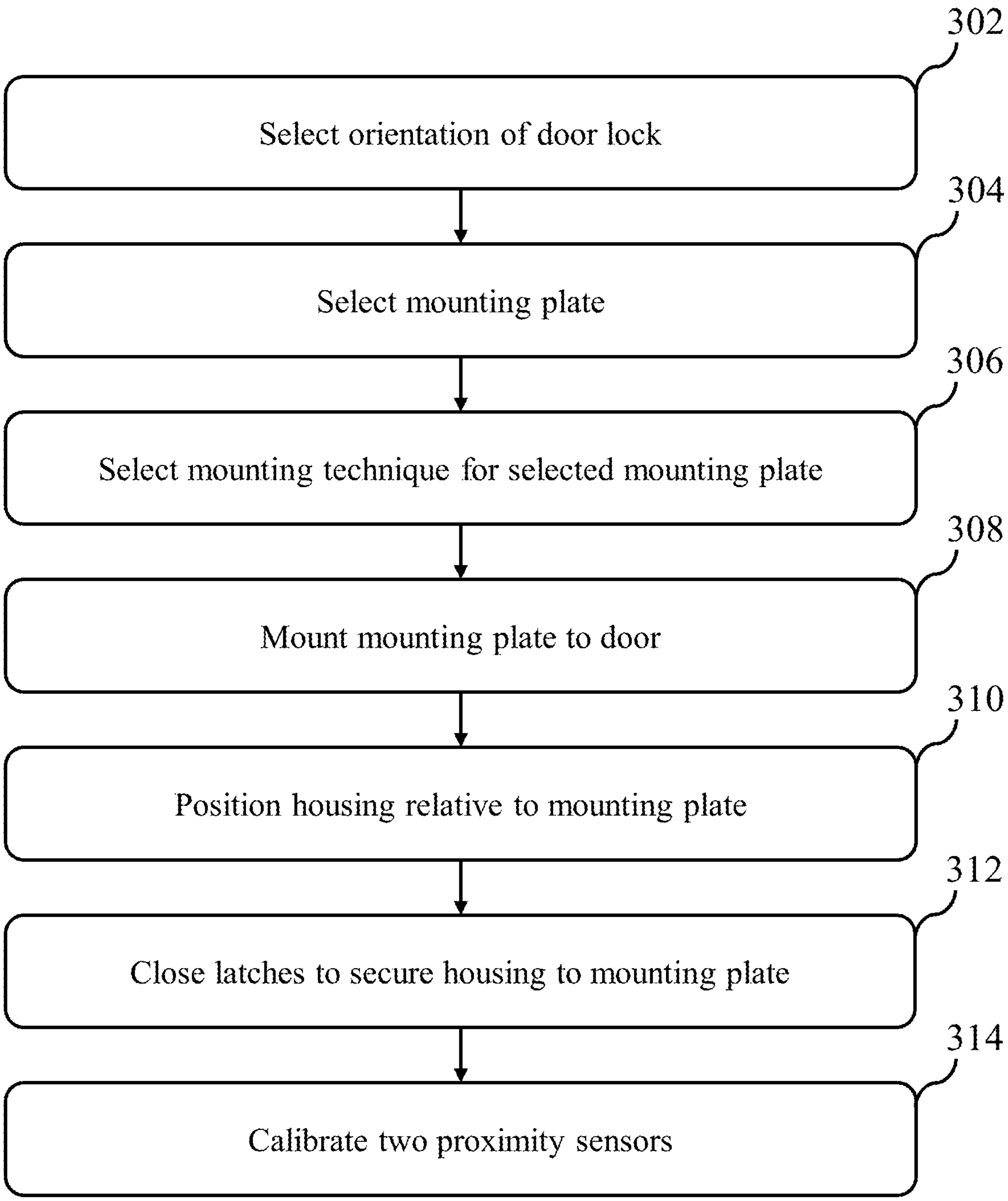
Figure 4:
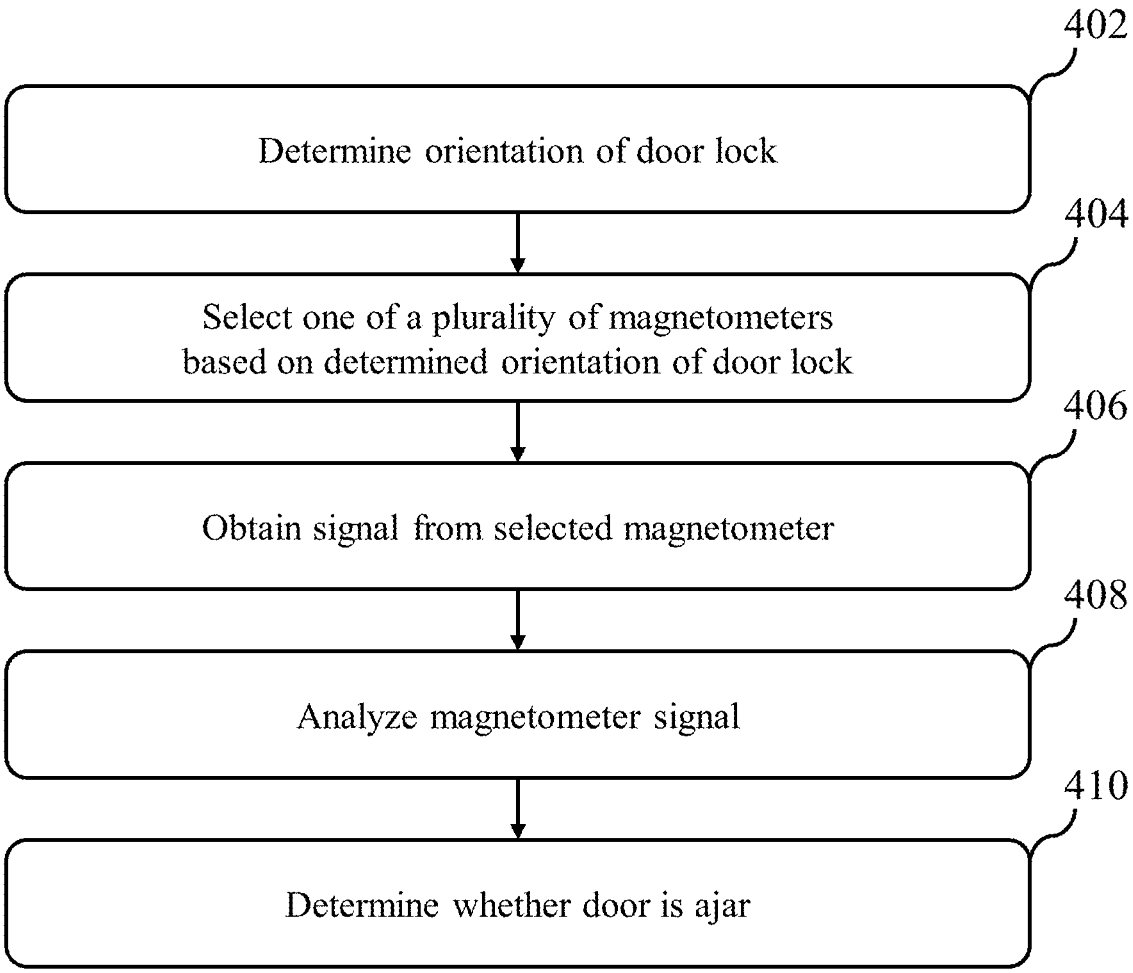
Figure 5:
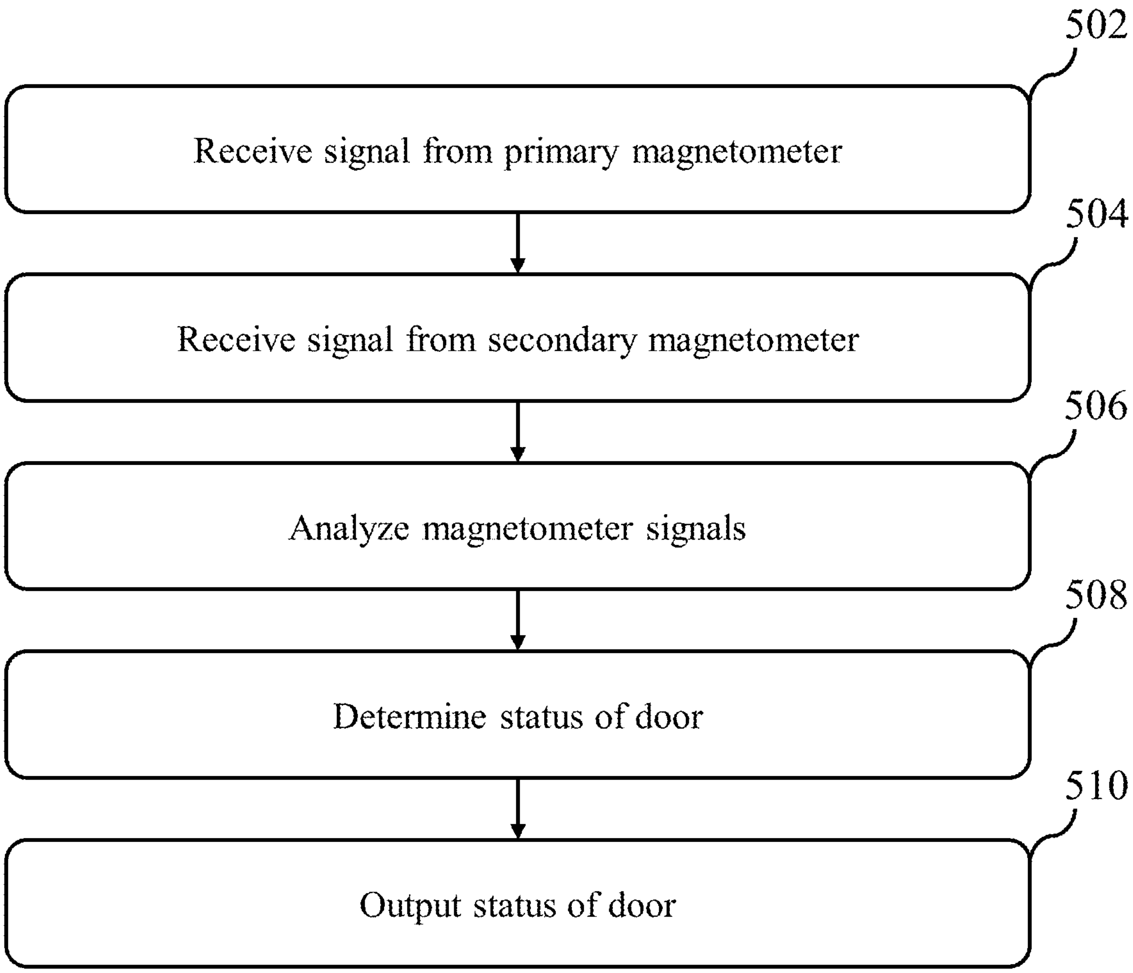

FIG. IC is a partially exploded front perspective view of the door lock from FIG. 1A and another embodiment of a mounting plate mounted on a door;

FIG. 2A is a front view of one embodiment of a door lock mounted on a door in a first orientation;

FIG. 2B is a front view of one embodiment of a door lock mounted on a door in a second orientation;

FIG. 2C is a front v of one embodiment of a door lock mounted on a door in a third orientation;

FIG. 2D is a front view of one embodiment of a door lock mounted on a door in a fourth orientation;

FIG. 3 is a flow chart for a method of installing a door lock according to some exemplary embodiments described herein;

FIG. 4 is a flow chart for a method of determining whether a door is ajar according to some exemplary embodiments described herein; and FIG. 5 is a flow chart for a method of determining a status of a door according to some exemplary embodiments described herein.

DETAILED DESCRIPTION

Traditionally, doors often employ deadbolt locks (also referred to simply as deadbolts) including a bolt that in a retracted (e.g., unlocked) position is disposed at least partially within a door and in an extended (e.g., locked) position extends out from the door, such as into a door jamb of a door frame. The physical presence of the bolt extending from within the door into the door jamb inhibits the door from being opened by blocking the door from being swung out of the door frame. Such deadbolt locks may include actuators to move a bolt of the lock between the extended position and/or the retracted position.

The inventors have contemplated that it may be desirable to have a door lock that includes and adds electromechanical drive capabilities for an associated deadbolt, that is also retrofittable to existing lock sets so consumers who desire remote or automatic actuation capabilities could add such capabilities without extensive modification of their existing doors. One example of such a door lock may be described in U.S. Pat. No. 9,528,296. Such door locks can often be manually actuated to directly drive the bolt, while also including an actuator and clutch mechanism for non-manual actuation of the bolt. Such lock actuators are configured to move the bolt of the lock between the extended position and/or the retracted position.

A door lock may include any of a variety of designs and may include a variety of different deadbolt styles. These differences may present differences in how an electromechanical actuator could be fitted to a lock set and/or could be used to drive a deadbolt lock of the lock set. For example, some lock sets may include internal screw receivers, such as different binding post barrels, into which screws are threaded to hold together different components of the lock set. In a retrofit scenario, a housing of a door lock driver that includes an electromechanical actuator to drive the bolt of the lock set might be affixed to the lock set using these existing screw receivers (e.g., binding post barrels). However, affixing the door lock using these existing screw receivers would cause complexity for the design of the door lock driver, since the screw receivers are in different places in different lock sets or may be of different sizes. Moreover, some lock set designs do not include such screw receivers, or the screw receivers may not be positioned in the lock in a manner that would be accessible for mounting a door lock driver. For example, some lock sets include a driveshaft that can drive a deadbolt between locked and unlocked positions, and the driveshaft may ordinarily be connected to a thumb turn on one side of the door. In some retrofit scenarios, the door lock driver may be connectable to and drive such a driveshaft, through removing the thumb turn and other external components of the existing lock set. Other lock sets, however, may not include such a drive shaft or thumb turn on one side of the door, but may instead have a key slot on both sides of the door that accepts a key to drive the deadbolt. In such a case, internal screw receivers would not be exposed, and a different style of mounting a door lock driver would be needed.

Moreover, there can be complexities to mounting a door lock driver to a door, so as to drive an existing lock set. Different doors may have different arrangements of door components. For example, some doors may have a deadbolt disposed above a door handle, while other doors may have a deadbolt disposed below a door handle. Additionally, some doors may include additional components such as integrated doorbells in the proximity of a deadbolt. The number, size, and arrangement of door components surrounding a deadbolt may all be relevant considerations when retrofitting a deadbolt with electromechanical drive capabilities. Some component arrangements may permit for installation of a door lock driver of a given design, while other components arrangements would not permit installation of that door lock driver and would need a different design.

There are thus a variety of different design choices for existing lock sets and different arrangement of door components, which lead to an array of door lock scenarios. Some scenarios are more common than others. For example, in certain geographic areas with door-mounted doorbells, the deadbolts are commonly driven by a thumb turn and thus may be electromechanically driven using a driveshaft. As another example, in certain geographic areas where the deadbolt is driven on both sides of the door with a key, the deadbolt may be arranged below the door handle. When designing a retrofit device, then, the natural solution would be to have different retrofit device designs for the different common scenarios.

Described herein, however, are some embodiments of a door lock that may be used for a variety of door lock and door scenarios. To be compatible with these different scenarios, the door lock is configured to be mounted to a door in multiple different orientations. Depending on the arrangement of door components, a non-axisymmetric door lock may be able to be mounted to an existing deadbolt in one orientation but not in another orientation, as explained in greater detail below. As such, during installation of door locks of these embodiments, a user is able to select an appropriate orientation of a door lock based on the arrangement of preexisting door components and/or any other space constraints related to the deadbolt area of the door. In addition, in some embodiments, the door lock is mountable to the door in those different orientations using multiple different techniques, such as using different positions or arrangements of screws (for different positions of screw receivers), using adhesives, or using other mounting techniques. Further, in some embodiments, the door lock drives the deadbolt by driving the driveshaft, while in other embodiments the door lock drives the deadbolt by driving a key positioned in a cylinder of the existing lock set.

In some embodiments, a mounting plate may be used to mount a door lock to a door. Different arrangements of components within the lock set or on the door may require different mounting techniques and orientations, as mentioned above, and in these embodiments may be addressed in part using different mounting plates. In some such embodiments, a multi-orientation door lock may mount to a given mounting plate in any of multiple orientations.

While the inventors have recognized that a multi-orientation door lock may be associated with certain benefits, the inventors also recognized that a multi-orientation door lock would the additional challenges that would not arise in a single-orientation door lock. For example, a processor of a door lock with an electromechanical actuator may base certain operations on the orientation of the door lock. For example, when the door lock is mounted in one orientation, rotating an output shaft of a motor clockwise may extend a deadbolt, whereas when the door lock is mounted in another orientation, rotating the output shaft of the motor clockwise may instead retract the deadbolt. As such, successful functioning of the multi-orientation door lock may be associated with the processor knowing the orientation in which the door lock is mounted to the door.

As another example, there may be benefits to a door lock that includes or is associated with one or more sensors to detect whether the door is open or closed. This may assist in determining whether the door is secured (e.g., closed and locked), which may not be determinable based only on the position of the deadbolt (e.g., the door may not be secured even if the deadbolt is in a locked position, because the door could be ajar). A proximity sensor could be used, such that a sensing component disposed on or within the door lock (or otherwise disposed on the door) may sense the distance to a sensed component disposed on a door jamb. For example, a magnetometer (or other magnetic sensor) of the door lock may be configured to sense a strength of a magnetic field of a magnet disposed on the door jamb. As the door opens or closes, the distance between the magnetometer and the magnet may increase or decrease, respectively, such that the sensed strength of the magnetic field varies as the door opens or closes. A signal output from the magnetometer may vary in a predictable way based on the status of the door, as the door swings toward or away from the magnet. As such, the signal output from the magnetometer may be used to determine a status of the door, such as whether the door is open or closed.

However, a door lock with such a magnetometer would face certain challenges if it were to be installed in multiple orientations. Mounting a door lock in different orientations could complicate the processor's interpretation of the sensor signals. For example, some orientations of the door lock may result in a position of the magnetometer that is too far away from a magnet mounted on the door jamb for accurate readings. While in one orientation a magnetometer may be disposed near the edge of the door and thus close enough to sense a magnetic field of a magnet disposed on the door jamb, in another orientation the magnetometer may be far from the magnet and unable to sense the magnetic field reliably.

As another example of such challenges, some door locks include magnetic materials that may affect the ability of a magnetometer to accurately sense a magnetic field of a magnet mounted on a door jamb, preventing reliable determination of a door status based on the sensed magnetic field. For example, as mentioned above, some deadbolts are operated on both sides of a door with a key in a cylinder of the lock set. These deadbolts and lock sets may be retrofitted by mounting an electromechanical door lock over the deadbolt while the key is inserted in the cylinder. To lock or unlock the deadbolt, an actuator within the door lock rotates the key in the appropriate direction. This presents a challenge to including a magnetometer. Often, deadbolt keys may be magnetic. The presence of the magnetic material near the magnetometer may impact the magnetic field sensed by the magnetometer. As such, a magnetometer disposed within the door lock may be unable to reliably sense the presence of a magnet on a door jamb and thus may be unable to reliably sense whether the door is open or closed using a magnetometer.

Furthermore, in some cases, a door lock with a magnetometer that includes electromechanical drive capabilities may be susceptible to attack from an unauthorized user. A processor of a door lock may use the magnetometer as described above to determine that a door is in either an "open" or "closed" state, and may also determine that a door lock is in either a "locked" or "unlocked" state. In some locks, if, for example, a door lock is determined to be in a "locked" state when the door is determined to be in an "open" state (which may be representative of an error, or an undesirable state, as a door lock may typically be in the "locked" state only when the door is in the "closed" state), the processor of the door lock may automatically initiate processes to unlock the door. This may be done to allow the door to be closed and locked properly. However, if an attacker is able to trick the processor of the door lock that is actually in a "locked, closed" state into thinking that the door lock is in a "locked, open" state, the processor may incorrectly perform the automatic operations to unlock the door, granting the attacker access. As described above, a door lock may determine whether the door is open or closed by analyzing a signal output by a magnetometer (or other sensor) of the door lock. An attacker equipped with a foreign magnet (i.e., a magnet other than the magnet disposed on the door jamb) may bring the foreign magnet into the proximity of the magnetometer of the door lock, thereby overriding the effect of the magnetic field of the magnet on the door jamb. In this way, the attacker may manipulate the magnetometer signal such that the processor improperly determines that a closed door is open, and consequently proceeds to unlock the lock.

There are thus a variety of challenges that arise with door lock drivers that are arranged to be installed in multiple orientations, and that would sway a designer of a door lock driver not to design a door lock that may be arranged in multiple orientations or to design a door lock that does not include a magnetometer. As discussed above, however, described herein are embodiments of a door lock driver that is configured to be mounted and operated in multiple different orientations and that may drive lock sets of a variety of types (e.g., via a drive shaft or by driving a key). In addition, described herein are embodiments that include two or more magnetometers.

In some embodiments, a door lock configured to be installed in multiple different orientations may include an accelerometer and may use the accelerometer to automatically determine the orientation in which the door lock has been installed. Additionally or alternatively, orientation information may be manually entered by an owner of the door lock through a user interface of the door lock and received by the processor. The door lock may be configured to use orientation information to determine how to perform various operations of the lock. For example, in some embodiments the door lock may determine in which direction (e.g., clockwise or counterclockwise) to drive a motor to move a deadbolt to an unlocked position. In some embodiments, as another example, the door lock may determine a manner in which to operate one or more magnetometers based on the orientation.

In view of the above, the inventors have recognized the benefits of a door lock with at least two magnetometers for state determination for a door. The two (or more) magnetometers may be disposed in different locations on or within the door lock. Due to an orientation of the door lock, one magnetometer may provide a more accurate reading than the other magnetometer. Through detecting the orientation, the door lock may designate one the primary magnetometer. For example, if signals output from a first magnetometer at one location in the door lock would be, given the orientation or configuration of the door lock, adversely affected by a nearby magnetic material (such as a magnetic key disposed in the deadbolt), signals from a second magnetometer that is disposed farther from the magnetic material may instead be analyzed, and the door lock may designate the second magnetometer the primary magnetometer. As another example, a magnetometer disposed near the edge of the door, and thus near the magnet disposed on the door jamb when the door is closed, may be designated as a primary magnetometer, and a magnetometer disposed away from the edge of the door, and thus away from the magnet disposed on the door jamb when the door is closed, may be designated as a secondary magnetometer. The primary magnetometer may be selected automatically based on an orientation of the door lock, as determined by an accelerometer reading, and/or the primary magnetometer may be selected manually based on an orientation of the door lock as determined by a user input. When the magnetometer signals are received by the processor, the information from the primary magnetometer may be given more weight, as this information may be more representative of the true state of the door.

The inventors have also recognized that a door lock with at least two magnetometers may mitigate risk of a successful attack. While an attacker may in some cases be able to manipulate the signal of a single magnetometer with a foreign magnet to trick the processor into determining an improper door state, simultaneously manipulating the signals of multiple magnetometers may be substantially more difficult, such that it may be impractical for an attacker to attempt to unlock a door lock with a foreign magnet.

In some embodiments, a door lock includes an actuator to drive a bolt of a lock set of the door to a locked position andlor to an unlocked position. An actuator may include a motor, a solenoid, or any other suitable actuator configured to adjust a position of a bolt. The actuator may be disposed at least partially within a housing. The housing may be configured to be mounted to a door. In some embodiments, a housing of the door lock may be mounted to the door via a mounting plate, as described in greater detail below.

Although the disclosure is not limited to door locks and/or housing of any particular shape, some door locks described may include non-axisymmetric housings. In some embodiments, the housing comprises a primary axis and a secondary axis perpendicular to the primary axis. The housing may be longer in a first dimension along the primary axis than in a second dimension along the secondary axis. That is, a housing of a door lock may be longer in one dimension than in another. For example, a housing may be at least 50% longer in a one dimension than in another. In some embodiments, a housing may be oval-shaped, and may include one or more straight edges between curved ends. Although some housings may be non-axisymmetric or elongate, it should be appreciated that axisymmetric housing are also contemplated, and the disclosure is not limited in this regard. In some embodiments, the housing comprises a first end and a second end opposite the first end along the primary axis. The actuator may be configured in the housing to drive the bolt via an interface disposed proximal to the first end of the housing. For example, a handle of the door lock that is configured to enable manual operation of the deadbolt may be proximal to the first end of the housing.

A door lock may include one or more sensors, such as proximity sensors and/or accelerometers. It should be appreciated that although the disclosure often refers to magnetometer and magnets, any suitable sensing component and sensed component may be included, as the disclosure is not limited in regard to sensing modality. In some embodiments, a first magnetometer is disposed proximal to a first end of the housing, and a second magnetometer is disposed proximal to a second end of the housing.

In some embodiments, a door lock is configured to drive a driveshaft that is couplable to the bolt. In some embodiments, the door lock may be configured to retrofit onto an existing deadbolt lock that was in place on a door prior to introduction of a lock system including an actuator for the bolt. The driveshaft may be a portion of the pre-existing deadbolt lock set and drives a bolt of the pre-existing deadbolt lock set. In such a case, certain external elements of the pre-existing deadbolt lock may be removed to expose the driveshaft, and components of the door lock may be arranged to enable the actuator to drive the driveshaft. It should be appreciated, however, that embodiments are not limited to a retrofit context and that the driveshaft and bolt may not be components of a pre-existing deadbolt lock.

According to exemplary embodiments described herein, a door lock may include one or more processors configured to coordinate one or more functions of the door lock. The processor(s) may be configured to execute one or more sets of computer-executable instructions stored on computer-readable storage onboard the door lock. The storage may be implemented as one or more volatile and/or non-volatile storages, such as non-volatile memory. The processor(s) may be configured to receive information from one or more sensors of the door lock, including signals from a magnetometer and/or accelerometer of the door lock. The processor(s) may also be configured to command one or more actuators of the door lock. For example, the processor(s) may command an actuator (e.g., a motor) to automatically move a driveshaft of the door lock. The processor(s) may also be configured to communicate with one or more other devices. For example, the processor(s) may control one or more wireless transmitters of the door lock to send or receive information/commands to or from a remote device, respectively. The door lock may include a power source configured to supply electrical power to the processor(s) and associated components. In some embodiments, the power source may be one or more batteries.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is a front perspective view of one embodiment of a door lock 100 mounted on an open door 10 proximate to a door jamb 12 associated with the door 10. The door lock 100 comprises a housing 102 that encloses a wireless transceiver, one or more processors, a power source, an actuator, a transmission, a driveshaft and/or additional internal components. The door lock 100 additionally comprises a mounting plate 104 configured to allow the housing 102 to be mounted to an associated door 10. The mounting plate 104 may allow the housing 102 to be mounted with one or more fasteners (e.g., screws) or toollessly (e.g., with one or more latches). In some embodiments, the mounting plate may mount to preexisting deadbolt lock hardware in the door. Of course, any suitable arrangement may be employed for mounting the housing 102 to a door, as the present disclosure is not so limited.

The door lock 100 additionally includes a handle 106 that may be rotated by a user to correspondingly rotate a driveshaft of the door lock 100. The driveshaft is in turn couplable to a bolt of the deadbolt and configured to transfer rotational motion of the driveshaft into linear movement of the bolt. The handle 106 may be continuously coupled to the driveshaft, such that whenever the bolt moves, the handle 106 correspondingly moves. Of course, in some embodiments the handle 106 may be selectively couplable to a driveshaft of the door lock, as the present disclosure is not so limited.

The door lock 100 additionally comprises a first magnetometer 120, a second magnetometer 122, and an accelerometer 130. It should be appreciated that while the first magnetometer 120, the second magnetometer 122, and the accelerometer 130 are depicted as being disposed on an external surface of the housing 102 in FIG. 1A, in other embodiments any or all of these components may be disposed within the interior of the door lock 100, or in any other suitable location, as the disclosure is not limited in this regard. A magnet 150 is disposed on the door jamb 12. As the door 10 swings between its open and closed states, the distance between the magnet 150 and the two magnetometers 120, 122 changes. Without wishing to be bound by theory, a detected or sensed strength of a magnetic field associated with a magnet may be related to a distance from the magnet. As such, because the magnetometers are capable of sensing a strength of a magnetic field, a processor of the door lock 100 is able to determine from the signals of the magnetometers the sensed strength of the magnetic field, and thus is able to make a determination of proximity of the door lock 100 to the magnet 150 and as to whether the door 10 is open or closed.

Figure 1B:
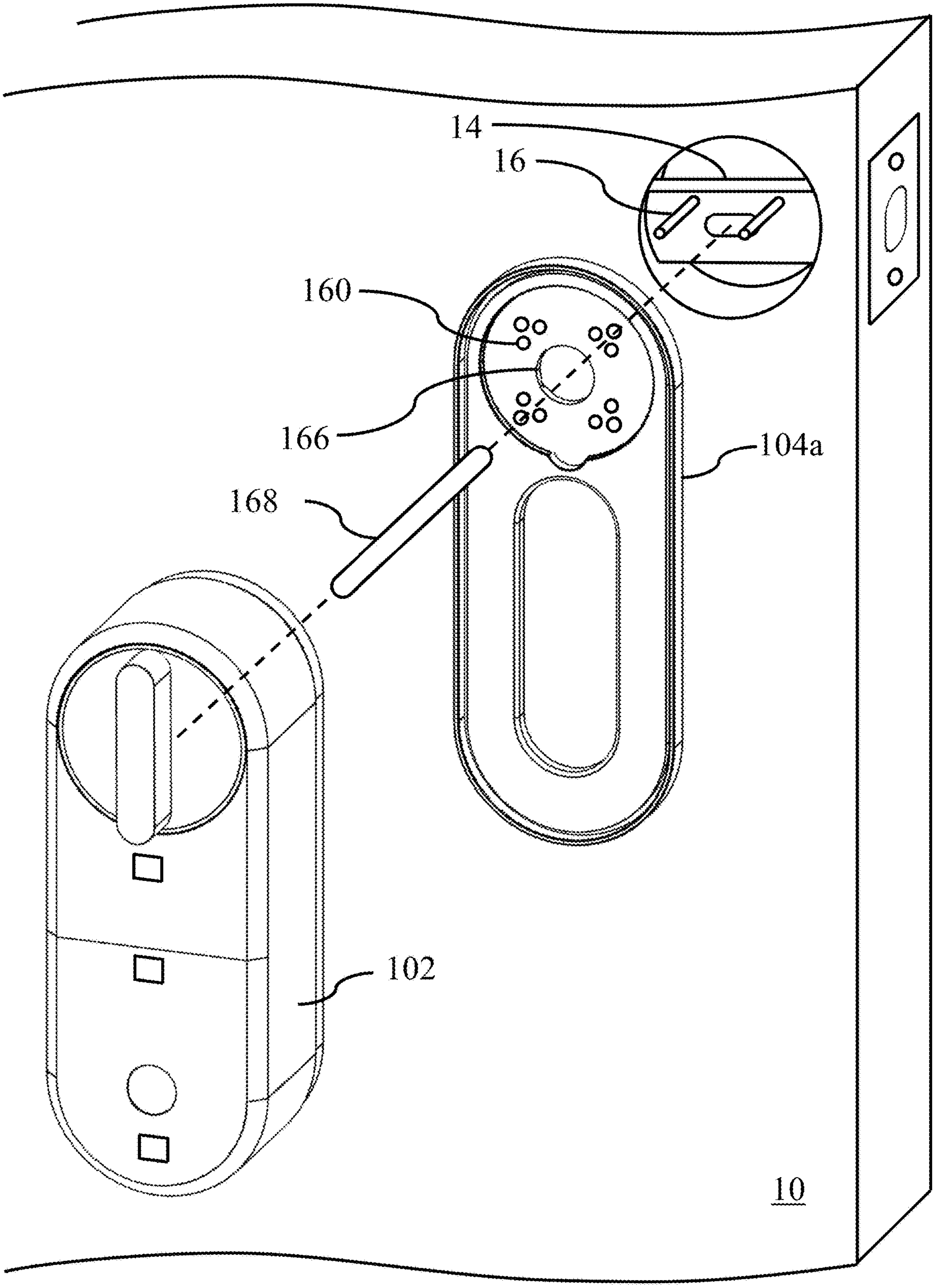
FIG. 1B is a partially exploded front perspective view of the door lock from FIG. 1A and one embodiment of a mounting plate mounted on a door.

FIG. 1B is a partially exploded front perspective view of one embodiment of a door lock and a first mounting plate 104*a* mounted on a door 10. In this embodiment, a housing 102 of the door lock (which includes and/or encloses one or more magnetometers, one or more accelerometers, a wireless transceiver, one or more processors, a power source, an actuator, a transmission, a driveshaft and/or additional components) is configured to mount to the first mounting plate 104*a*.

The first mounting plate 104*a* is configured to mount to existing hardware of the deadbolt that is installed in the door 10. In this embodiment, a bolt (not shown) is retained within a deadbolt housing 14. Extending from the deadbolt housing are two mounting rods 16. The first mounting plate 104*a* is configured to mount to the door 10 by engaging the existing hardware of the deadbolt. In this embodiment, the mounting rods 16 extend through corresponding mounting holes 160 in the first mounting plate 104*a*. The first mounting plate 104*a* includes a mounting hole pattern such that the mounting rods 16 may be received by the at least some of the plurality of mounting holes 160 in any of at least four orientations. That is, the first mounting plate 104*a* is configured to be mounted to the existing hardware of the deadbolt in any of at least four orientations. One or more threaded fasteners (including screws or bolts) may be used to mount the plate 104*a* to the door 10 by coupling the one or more threaded fasteners to one or more of the mounting rods 16. The mounting rods 16 may be embodied, for example, as binding post barrels or similar hardware including a threaded cavity into which a threaded fastener may be threaded.

The first mounting plate 104*a* additionally includes a central bore 166, through which a driveshaft 168 is configured to pass. The driveshaft 168 may couple the output of the actuator of the door lock (optionally via a transmission and/or any suitable number of adapters) to the existing hardware of the deadbolt, such that engaging the actuator causes the bolt to extend and/or retract. It should be appreciated that different adapters may be used to couple the actuator (or transmission) to the different driveshafts of the deadbolt, thereby enabling a single door lock to be compatible with different deadbolt designs.

Figure 1C:
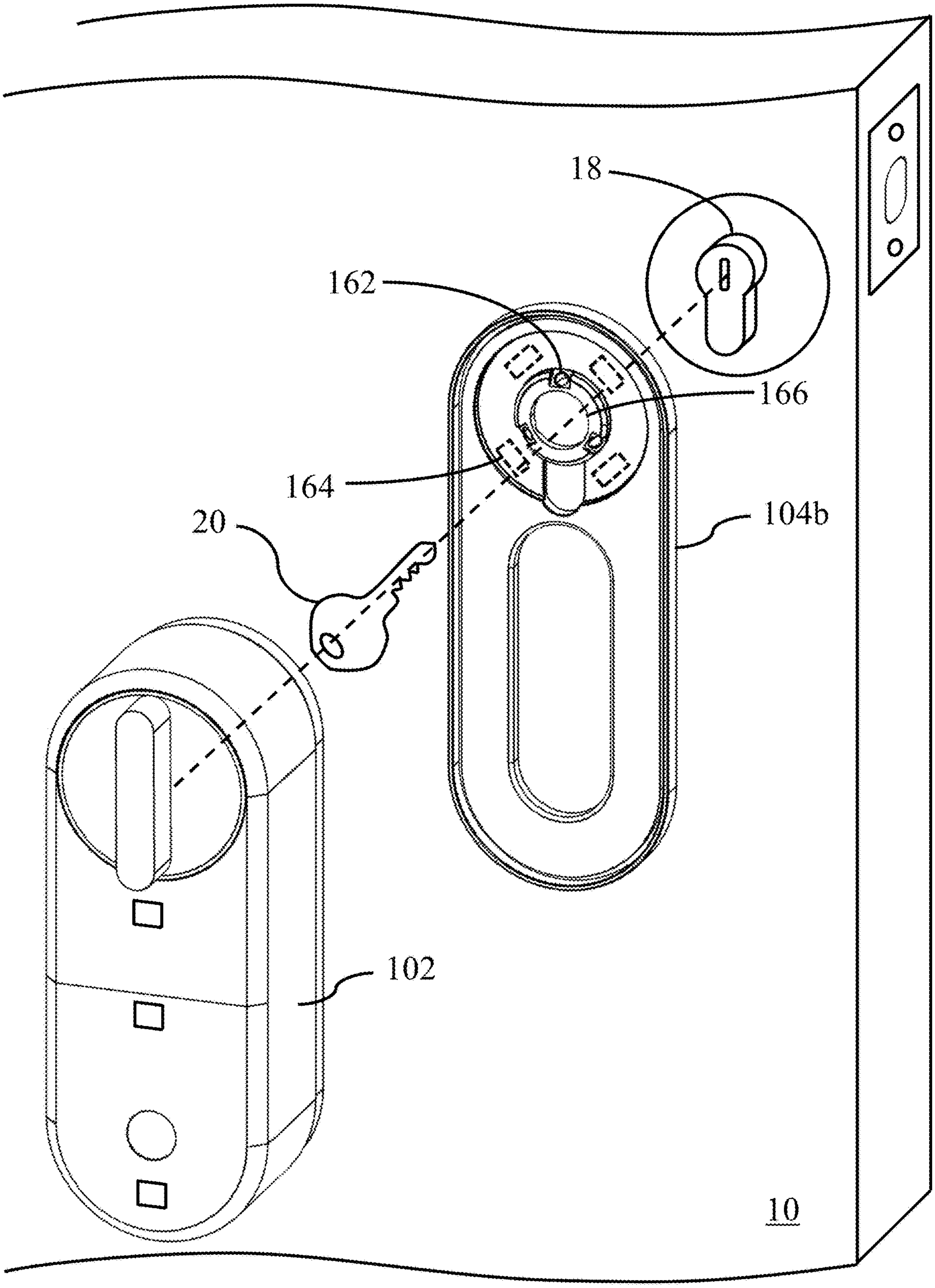

FIG. 1C is a partially exploded front perspective view of one embodiment of a door lock and a second mounting plate 104*b* mounted on a door 10. In this embodiment, the door 10 includes a lock cylinder 18 that protrudes beyond the plane of the door. The second mounting plate 104*b* is configured to mate with the protruding lock cylinder 18 by means of a central bore 166 that receives the lock cylinder 18. The second mounting plate 104*b* includes a plurality of set screw holes 162 around the perimeter of the central bore 166, The set screw holes 162 are configured to receive set screws that, when installed, engage the lock cylinder 18 extending into the central bore 166. The resulting frictional contact between the set screws and the lock cylinder 18 secures the position and orientation of the second mounting plate 104*b* relative to the door 10. In some embodiments, mounting rods may additionally extend into corresponding mounting holes of the second mounting plate 104*b*, and/or adhesive 164 may be used to adhere the second mounting plate 104*b* to the door 10. It should be appreciated that any or all of these mounting mechanisms may be employed alone or in combination to mount a mounting plate to a door, as the use of one mounting mechanism need not necessitate nor imply the use of any other mounting mechanism.

In the embodiment of FIG. 1C, a key 20 is inserted into the lock cylinder 18 when the housing 102 (and enclosed components) is mounted to the second mounting plate 104*b*. As such, an output of the actuator and/or transmission of the door lock may include an adapter configured to engage with the key 20. Such an adapter may include, for example, a slot or pocket into which the key is inserted when the housing is fitted over the key. In this way, rotation of the actuator of the door lock may rotate the key 20 to extend and/or retract the bolt of the deadbolt, thereby locking or unlocking the door.

The plate 104*b* of FIG. 1C may also include, in some embodiments, an adhesive material 164 on the surface of the plate 104*b* that contacts the door 10. In some cases, the lock cylinder 18 of the lock may be flush with the surface of the door 10, or sufficiently flush with the surface of the door 10, to impede the set screws from being secured to the cylinder 18 in a manner that would form a reliable mount. In some such cases, rather than using the set screws and the set screw holes 162, the plate 104*b* may be mounted on the door 10 using the adhesive material 164. In some cases, the adhesive material 164 may be covered with a cover made of any suitable removable material, such as a waxed paper or other suitable material. When the adhesive 164 is not used for the mounting, the cover may remain on the adhesive 164. The adhesive 164 may be exposed by removing the cover, when the adhesive 164 is to be used.

In some embodiments, a kit may be provided that includes the lock 102 (and components thereof) as well as the plates 104*a* and 104*b*, as well as suitable adapters for driving a driveshaft and/or a key.

FIG. 2A-2D are front views of a door lock 200 mounted on a door 20 in different orientations. In some embodiments, a door lock may be configured to be mounted in any of at least four orientations.

FIG. 2A depicts a door lock 200 mounted on a door 20 in a first orientation. In this embodiment, a door handle 24 of the door 20 is arranged directly below a deadbolt of the door 20. Correspondingly, the door lock 200 is mounted in a vertical orientation such that the door lock 200 extends up and away from the deadbolt, with lock 200 located on the door such that the actuator and thumb turn or handle of the door lock 200 are mounted over a key or driveshaft of the existing lock set (see discussion of FIGS. 1B-1C above). In this orientation, the primary axis of the housing is aligned with a height axis of the door and the second end of the housing is located closer to a top of the door than the first end.

FIG. 2B depicts a door lock 200 mounted on a door 20 in a second orientation. In this embodiment, a door handle 24 of the door 20 is arranged directly above a deadbolt of the door 20. Correspondingly, the door lock 200 is mounted in a vertical orientation such that the door lock 200 extends down and away from the deadbolt, with lock 200 located on the door such that the actuator and thumb turn or handle of the door lock 200 are mounted over a key or driveshaft of the existing lock set (see discussion of FIGS. 1B-1C above). In this orientation, the primary axis of the housing is aligned with the height axis of the door and the first end of the housing is located closer to the top of the door than the second end.

FIG. 2C depicts a door lock 200 mounted on a door 20 in a third orientation. In this embodiment, a door handle 24 of the door 20 is arranged directly below a deadbolt of the door 20. Additionally, a doorbell 26 or other door-mounted component is arranged directly above the deadbolt. Correspondingly, the door lock 200 is mounted in a horizontal orientation such that the door lock 200 extends to the left and away from the edge of the door, with lock 200 located on the door such that the actuator and thumb turn or handle of the door lock 200 are mounted over a key or driveshaft of the existing lock set (see discussion of FIGS. 1B-1C above). In this orientation, the primary axis of the housing is aligned with a width axis of the door and the first end is located to the right of the second end.

FIG. 2D depicts a door lock 200 mounted on a door 20 in a fourth orientation. In this embodiment, a door handle 24 of the door 20 is arranged directly below a deadbolt of the door 20. Additionally, a doorbell 26 or other component is arranged directly above the deadbolt. However, in contrast to FIG. 2C, the door of FIG. 2D is of the opposite sense. That is, whereas the door 20 of FIG. 2C includes hinges 22 toward the left side of the door and the handle 24 toward the right side of the door, the door 20 of FIG. 2D includes hinges 22 toward the right side of the door and the handle 24 toward the left side of the door. Correspondingly, the door lock 200 is mounted in a horizontal orientation such that the door lock 200 extends to the right and away from the edge of the door, with lock 200 located on the door such that the actuator and thumb turn or handle of the door lock 200 are mounted over a key or driveshaft of the existing lock set (see discussion of FIGS. 1B-1C above). In this orientation, the primary axis of the housing is aligned with a width axis of the door and the first end is located to the left of the second end.

It should be appreciated that the position of a door lock relative to a handle of the door is non-limiting. For example, the door lock could be mounted in a horizontal left or horizontal right orientation at a location above or below the handle, or the door lock could be mounted in a vertical up or vertical down orientation at a location above or below the handle, (assuming no other door components are mounted to the door that would be in the way, of course). An orientation of the door lock (e.g., vertical up, vertical down, horizontal left, horizontal right, or any other) need not be related to a position of the door lock relative to any other door component (e.g., above, below, to the left, or to the right of, for example, a door handle). Also, it should be appreciated that a door lock may be mounted in any orientation on either side of a door of any sense (i.e., whether the door hinges are to the right or to the left), as the disclosure is not so limiting.

FIG. 3 is a flow chart for a method of installing a door lock according to some exemplary embodiments described herein. At block 302, a desired orientation of the door lock is selected. As described above, an orientation of a door lock may be selected based at least in part on the locations and orientations of other door components, user preference, or other factors. At block 304, an appropriate mounting plate is selected. The selection of the mounting plate may depend at least in part on the selected orientation of the door lock, in addition to other factors including but not limited to the style and/or design of the deadbolt to be retrofitted or the locations and orientations of other door components, such as a door handle. At block 306, an appropriate mounting technique is selected for the selected mounting plate. As described above, mounting techniques may include (but are not limited to) screws to engage with preexisting deadbolt hardware, set screws to engage with a lock cylinder, and adhesive to adhere to a surface of the deadbolt or door. At block 308, the mounting plate is mounted to the door, which may include mounting the mounting plate to a deadbolt of the door. In some embodiments, the mounting plate may be secured to the door in one of at least four orientations.

At block 310, the housing is positioned relative to the mounting plate. The position of the housing relative to the mounting plate may depend at least in part on the desired orientation of the door lock as well as the orientation of the mounting plate. In some embodiments, positioning a housing relative to the mounting plate may include engaging an actuator and/or a transmission disposed within the housing with a driveshaft and/or other component of a preexisting deadbolt of the door. The actuator may be configured to drive a bolt of the deadbolt to a locked position and/or to an unlocked position via the transmission and/or the driveshaft, At block 312, latches of the door lock are closed to secure the housing of the door lock to the mounting plate. At block 314, two (or more) proximity sensors are calibrated. Calibration of the proximity sensors may include opening and closing the door, and recording signals produced by the proximity sensors. For example, while the door is closed, a user may indicate to the processor that the door is closed via a user interface, and the processor may record the corresponding signals from the proximity sensors as indicative of the door being closed. A similar procedure may be repeated when the door is open, or at multiple different states of the door being open, Of course, it should be appreciated that proximity sensors may be calibrated in any of a plurality of different ways, and the disclosure is not limited in how a proximity sensor may be calibrated.

In some embodiments, installing a door lock may additionally include manually selecting an orientation of the housing via a user interface. Such a user interface may be integrated with the housing of the door lock in some embodiments, and in such a case may take any suitable form, as embodiments are not limited in this respect. For example, a switch or button may be used to input the orientation. In other embodiments, the user interface may not be integrated with the housing, but may instead be located on another device. For example, a user's computing device (e.g., a smart phone, a wearable computing device such as a smart watch or smart glasses, a tablet computing device, a laptop or desktop personal computer, a personal digital assistant (PDA), or other device) may execute software such as an app and may, through the software, present a user interface to the user. The user may operate the user interface to input orientation into the user interface. The software and the device may then wirelessly communicate the orientation to a processor disposed within the housing, and the processor may store the orientation information upon receipt.

In embodiments in which the proximity sensors are magnetometers (or other magnetic sensors), installing a door lock may additionally include securing a magnet or magnetic material to a door jamb associated with the door. Where the proximity sensors are embodied as other sensors to sense another material or device, installation may include securing such other material or device to the jamb.

FIG. 4 is a flow chart for a method of determining whether a door is ajar according to some exemplary embodiments described herein. The method of FIG. 4 may be implemented by the door lock via executable instructions stored on one or more storages (e.g., memory) of the door lock and executed by a processor of the door lock, or otherwise implemented by a control circuit.

It should be appreciated that, as used herein relating to that state or status of a door, the terms "open" and "ajar" are used synonymously to mean "not closed".

At block 402, the door lock determines an orientation in which it was mounted to the door. In some embodiments, the door lock may determine the orientation automatically by analyzing signals of an accelerometer (or other sensor) of the door lock. In some embodiments, the door lock may determine the orientation in accordance with information received via a user interface from a user who manually enters the information. The door lock may obtain the information via any suitable user interface, including a user interface integrated with the door lock or another user interface, and in some embodiments may receive orientation information wirelessly from a computing device separate from the door lock, such as from a smartphone of the user running an associated application.

At block 404, the door lock selects one of a plurality of magnetometers of the door lock as a primary magnetometer. The primary magnetometer may be selected based at least in part on the determined orientation of the door lock. For example, the door lock may be configured with information on the locations of each of the magnetometers in the door lock, and the door lock may select a magnetometer that is in a location closest to a door jamb when the door is closed. In some embodiments, the door lock may be configured to select a certain magnetometer as the primary magnetometer when the lock is in a certain orientation.

At block 406, a signal from the selected magnetometer is obtained. At block 408, the door lock analyzes the magnetometer signal as part of determining a door status (e.g., closed or ajar). In some embodiments, to analyze the signal, the door lock compares the signal to a reference signal, such as a signal generated during a calibration routine. Such a reference signal may correspond to an expected value of the magnetometer signal when the door is closed. If the signal from the magnetometer at a time matches the reference signal, such as equaling the reference signal and/or being within a threshold amount of the reference signal, the door may be closed, however, the magnetometer signal does not match the reference signal, the door may be open. The door lock may analyze the magnetometer signal with respect to the reference signal to make this determination.

At block 410, a determination is made as to whether the door is ajar, based at least in part on a result of the analysis of the signal. The process of FIG. 4 then ends. Following the process, the determination of block 410 may be used in any suitable manner. For example, if the door is determined to be open/ajar, then in some embodiments a notification may be sent to a user that the door is open. This may include wirelessly transmitting a notification from the door lock directly to a user's computing device or to another device (e.g., a server) which may notify a user that the door is open. If the process of FIG. 4 was initiated by a user or other entity requesting information on door status, following the process, the door lock may transmit a response to the request, indicating the determined status of the door (e.g., closed or open/ajar).

The method of FIG. 4 was described in connection with use of one signal from one magnetometer. It should be appreciated, however, that embodiments are not so limited. In some embodiments, while one magnetometer may be treated as the primary magnetometer and may be chiefly used to determine door status, in other embodiments one or more secondary magnetometers may additionally be used to determine door status. In some such embodiments, a result of analyzing a primary magnetometer's signal may be weighted most in making a determination of door status, while the result(s) of analyzing the signal(s) from the secondary magnetometer(s) may be weighted less. In embodiments in which signals from multiple magnetometers are analyzed, the signals may in some embodiments be analyzed in similar ways. For example, if the analysis includes comparing a signal to a reference value, such as from calibration, each of the magnetometer signals may be respectively compared to a corresponding reference signal, each of which may have been obtained during a calibration. If all signals match the reference signals and thus all indicate that the door is closed, then the determination may be made that the door is closed. If the comparison result for the primary magnetometer indicates that the door is closed but the comparison result for the secondary magnetometer indicates that the door is open, the comparison result from the primary magnetometer may be used as the result. Or, if the two results differ, the door lock may determine that the door status is uncertain, or may output a status determination that indicates that the door may be in one status but that another of the magnetometers indicates that the door may be in another status.

While the method of FIG. 4 is described in reference to magnetometers, it should be appreciated that any suitable proximity sensor may be used, as the disclosure is not so limited.

FIG. 5 is a flow chart for another method of determining a status of a door according to some exemplary embodiments described herein. The method of FIG. 5 may, in some embodiments, be used to determine whether a door is being subjected to an attack, such as in a scenario in which an attacker is using a foreign magnet to try to cause a magnetometer of the door lock to output an incorrect value and cause the door lock to reach an incorrect conclusion about the door status. The method of FIG. 4 may be implemented by the door lock via executable instructions stored on one or more storages (e.g., memory) of the door lock and executed by a processor of the door lock, or otherwise implemented by a control circuit.

It should be appreciated that a status of a door may be determined for any appropriate reason, including but not limited to simply confirming the status of the door, or determining whether or not to unlock the door, such as in response to a request to unlock the door.

At block 502, the door lock receives a first signal from a primary magnetometer of the door lock. As explained above, the door lock may select a primary magnetometer based at least in part on an orientation of the door lock, including using techniques described above. At block 504, the door lock receives a second signal from a secondary magnetometer of the door lock.

At block 506, the door lock analyzes the first and second signals. Analyzing the signals may include comparing the first signal to a first reference signal and the second signal to a second reference signal. As described above, reference signals may be generated during a calibration routine.

In some embodiments, in block 506, the door lock may also determine whether the first and second signals are consistent with one another. For example, if the first signal matches a corresponding reference value and the second signal does not (or vice versa), the door lock may determine that the two signals are inconsistent with one another. As another example, in some embodiments, the door lock may determine whether, for a given value of the first reference signal, the value of the second signal matches an expected value of the second signal. This may be done because, under ordinary circumstances (i.e., not during an attack), the two magnetometers may output signals in a predictable manner, and in a manner that varies predictably. This is because, for a hinged door, the magnetometers may output a signal that varies along the swing path of the door, as the magnetometers move farther away from or closer to a magnet disposed on a jamb, and may output that same signal (or a signal within a threshold difference of tolerance) each time the door is swung. Given that, there may be predictable values for both magnetometers, and a value output by one magnetometer may correspond to a particular position of the door along a swing path and a value that would be output by the other magnetometer at that door position may be determinable. As such, the door lock may determine, for a given value obtained in block 502 for a magnetometer, whether the value of the signal for the other magnetometer matches the expected/predicted value for that magnetometer.

As another example, the door lock may determine whether recent changes in the values of the first and second signals output by the magnetometers have been consistent. For example, a first signal changing significantly while a second signal remains constant may be inconsistent with signals output by magnetometers that are both mounted on the same door and thus should change or hold constant together, and may be indicative of an attack.

At block 508, the door lock determines a status of the door based on a result of the analysis of the first signal and the second signal in block 506. In some embodiments, determining a status of a door may include determining that the first and second signals indicate that the door is either ajar or closed. In some embodiments, the door lock may also in some cases determine that the signals are indicative of an unexpected state. This may be an unexpected state of the magnetometer signals, indicating that the door status is indeterminate or unexpected.

An unexpected state may in some cases be indicative of an attack (e.g., an in-progress break-in attempt), or in other cases may be indicative of an error. In some embodiments, detecting an unexpected state may include determining that the first and second signals do not both indicate the same door status, or are inconsistent with one another. Of course, unexpected states may be detected based on the first and second signals in other ways, and it should be appreciated that the disclosure is not limited in regard to how an expected state is detected.

At block 510, the door lock outputs the status of the door. Outputting the status of the door may include, in a case that an unexpected state is determined (which may be indicative of an attack) wirelessly sending an alert from the door lock to a recipient outside the door lock, such as to an owner of the door lock or to law enforcement. As such, in these embodiments, if a possible attack is detected, the owner of the lock and/or law enforcement may be notified. In other embodiments, however, rather than detecting a possible state, a door lock error may be detected, and only the owner of the lock may be notified and not law enforcement.

In some embodiments, the method may also include configuring the door lock to refrain from unlocking the door lock in response to a detection of a possible attack on the door. As mentioned above, some successful attacks on the door may cause a door lock to unlock automatically. In some embodiments, therefore, the door lock may not unlock for a time, even in response to a request to unlock that purports to be received from the homeowner or another valid user of the lock. This may prevent opening of the door in a scenario in which the door lock has detected that an attempt to break into the door is underway. In some such embodiments, the door lock may only refrain from unlocking for a certain time period, which may be configured. For example, a suitable time period may be five minutes, ten minutes, one hour, or other suitable time period.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers, Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Such processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of determining a status of a door, the method comprising:

receiving a first signal from a first magnetometer disposed within a door lock of the door;

receiving a second signal from a second magnetometer disposed within the door lock of the door; and detecting, based on a result of an evaluation of both the first signal and the second signal, a possible attack on the door;

wherein the evaluation of both the first signal and the second signal comprises weighting the first signal and the second signal based at least in part on an orientation of the door lock.

2. The method of claim 1, wherein detecting, based on the result of the evaluation of both the first signal and the second signal, the possible attack on the door comprises:

comparing the first signal to a first reference signal and the second signal to a second reference signal; and in response to the comparing of the first and second signals to the first and second reference signals, detecting the possible attack on the door.

3. The method of claim 1, further comprising:

sending an alert to an owner of the door lock in response to detecting the possible attack on the door.

4. The method of claim 1, further comprising:

sending an alert to law enforcement in response to detecting the possible attack on the door.

5. The method of claim 1, further comprising:

refraining from unlocking the door lock in response to identifying the possible attack on the door.

6. The method of claim 2, wherein comparing the first and second signals to the first and second reference signals comprises comparing the first and second signals to signals generated during a calibration routine.

7. The method of claim 1, wherein detecting, based on the result of the evaluation of both the first signal and the second signal, the possible attack on the door comprises:

determining whether the first and second signals are consistent; and in response to determining that the first and second signals are inconsistent, detecting the possible attack on the door.

8. At least one non-transitory computer-readable storage medium having encoded thereon executable instructions that, when executed, cause at least one processor to carry out a method of determining a status of a door, the method comprising:

receiving a first signal from a first magnetometer disposed within a door lock of the door; receiving a second signal from a second magnetometer disposed within the door lock of the door; and detecting, based on a result of an evaluation of both the first signal and the second signal, a possible attack on the door;

wherein the evaluation of both the first signal and the second signal comprises weighting the first signal and the second signal based at least in part on an orientation of the door lock.

9. The at least one non-transitory computer-readable storage medium of claim 8, wherein detecting, based on the result of the evaluation of both the first signal and the second signal, the possible attack on the door comprises:

comparing the first signal to a first reference signal and the second signal to a second reference signal; and in response to the comparing of the first and second signals to the first and second reference signals, detecting the possible attack on the door.

10. The at least one non-transitory computer-readable storage medium of claim 8, wherein the method further comprises:

sending an alert to an owner of the door lock in response to detecting the possible attack on the door.

11. The at least one non-transitory computer-readable storage medium of claim 8, wherein the method further comprises:

sending an alert to law enforcement in response to detecting the possible attack on the door.

12. The at least one non-transitory computer-readable storage medium of claim 8, wherein the method further comprises:

refraining from unlocking the door lock in response to identifying the possible attack on the door.

13. The at least one non-transitory computer-readable storage medium of claim 9, wherein comparing the first and second signals to the first and second reference signals comprises comparing the first and second signals to signals generated during a calibration routine.

14. The at least one non-transitory computer-readable storage medium of claim 8, wherein detecting, based on the result of the evaluation of both the first signal and the second signal, the possible attack on the door comprises:

determining whether the first and second signals are consistent; and in response to determining that the first and second signals are inconsistent, detecting the possible attack on the door.

15. An apparatus comprising:

an actuator to drive a bolt of a door lock of a door to a locked position and/or to an unlocked position;

a housing of the door lock configured to be mounted to the door, the actuator disposed at least in part within the housing;

a first magnetometer disposed at least in part within the housing;

a second magnetometer disposed at least in part within the housing;

at least one processor disposed within the housing; and at least one storage medium disposed within the housing and having encoded thereon executable instructions that, when executed, cause the at least one processor to carry out a method comprising:

receiving a first signal from the first magnetometer;

receiving a second signal from the second magnetometer; and detecting an unexpected sensor state based at least in part on the first and second signals and one or more reference signals.

16. The apparatus of claim 15, further comprising:

a computing device separate from the housing, the computing device comprising at least one wireless communication circuit, the computing device configured to wirelessly transmit information associated with a status of the door.

17. A kit comprising:

the apparatus of claim 15; and a magnet configured to be mounted on a door jamb associated with the door, wherein each of the first and second sensors is configured to sense the magnet.

18. The apparatus of claim 15, wherein the unexpected sensor state corresponds to a position of the door.

19. The apparatus of claim 15, wherein the unexpected sensor state corresponds to a door lock error.

20. The apparatus of claim 15, wherein the one or more reference signals include a first reference signal generated by the first magnetometer during a calibration routine.

* * * * *